(12) United States Patent
Ko et al.

(10) Patent No.: US 8,848,600 B2
(45) Date of Patent: Sep. 30, 2014

(54) METHOD AND APPARATUS FOR EFFICIENTLY TRANSMITTING CONTROL INFORMATION TO SUPPORT UPLINK MULTIPLE ANTENNA TRANSMISSION

(75) Inventors: Hyun Soo Ko, Anyang-si (KR); Jae Hoon Chung, Anyang-si (KR); Seung Hee Han, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 173 days.

(21) Appl. No.: 13/637,978

(22) PCT Filed: Mar. 29, 2011

(86) PCT No.: PCT/KR2011/002153
§ 371 (c)(1),
(2), (4) Date: Sep. 27, 2012

(87) PCT Pub. No.: WO2011/122831
PCT Pub. Date: Oct. 6, 2011

(65) Prior Publication Data
US 2013/0016604 A1    Jan. 17, 2013

Related U.S. Application Data

(60) Provisional application No. 61/318,780, filed on Mar. 29, 2010, provisional application No. 61/325,346, filed on Apr. 18, 2010, provisional application No. 61/353,663, filed on Jun. 11, 2010, provisional application No. 61/359,280, filed on Jun. 28, 2010.

(30) Foreign Application Priority Data

Mar. 29, 2011  (KR) .................. 10-2011-0028302

(51) Int. Cl.
*H04B 7/204*    (2006.01)
*H04B 7/04*    (2006.01)
*H04L 1/18*    (2006.01)
*H04B 7/06*    (2006.01)

(52) U.S. Cl.
CPC ............ *H04L 1/1861* (2013.01); *H04B 7/0404* (2013.01); *H04B 7/0639* (2013.01); *H04B 7/0619* (2013.01); *H04B 7/0617* (2013.01)
USPC ........................................................ 370/319

(58) Field of Classification Search
CPC ..... H04L 5/001; H04L 5/0055; H04L 1/0026; H04L 1/0027; H04L 1/1861; H04L 5/0053; H04L 5/0057; H04L 27/0006; H04L 5/0058
USPC .......... 370/319, 316, 315, 310; 714/699, 746, 714/748, 749
See application file for complete search history.

(56) References Cited

U.S. PATENT DOCUMENTS 8,594,036 B2 * 11/2013 Kang et al. .................... 370/329
2011/0235586 A1 * 9/2011 Han et al. ...................... 370/328
(Continued)

OTHER PUBLICATIONS
Haitong Sun et al., "Iterative Transceiver Design for MIMO ARQ Retransmissions With Decision Feedback Detection", IEEE Transactions on Signal Processing, vol. 55, No. 7, Jul. 2007.
(Continued)

*Primary Examiner* — Fan Ng
(74) *Attorney, Agent, or Firm* — Lee, Hong, Degerman, Kang & Waimey

(57) ABSTRACT

The present invention relates to a method for transmitting control information regarding uplink multiple antenna transmission may comprise the steps of: transmitting DCI for scheduling the uplink transmission of a plurality of data blocks through a PDCCH; receiving the plurality of data blocks scheduled by the DCI; transmitting information which indicates positive acknowledgement or negative acknowledgement to each of the plurality of received data blocks through the PHICH; and receiving retransmission for the negative acknowledged data blocks. When the number of the negative-acknowledged data blocks is not equal to the number data blocks indicated in the PDCCH, a pre-coding matrix, which is for the number of transmission layers equivalent to that of layers corresponding to the negative-acknowledged data blocks, may be used for retransmission.

14 Claims, 11 Drawing Sheets

(56) References Cited

U.S. PATENT DOCUMENTS

| | | | |
|---|---|---|---|
| 2012/0063438 A1* | 3/2012 | Kang et al. | 370/338 |
| 2012/0320863 A1* | 12/2012 | Lee et al. | 370/329 |
| 2013/0010745 A1* | 1/2013 | Ko et al. | 370/329 |
| 2013/0016604 A1* | 1/2013 | Ko et al. | 370/216 |
| 2013/0094468 A1* | 4/2013 | Ko et al. | 370/329 |

OTHER PUBLICATIONS

Zhihua Shi et al., "Linear Precoder Optimization for ARQ Packet Retransmissions in Centralized Multiuser MIMO Uplinks", IEEE Transactions on Wireless Communications, vol. 7, No. 2, Feb. 2008.

* cited by examiner (a)

(b)

METHOD AND APPARATUS FOR EFFICIENTLY TRANSMITTING CONTROL INFORMATION TO SUPPORT UPLINK MULTIPLE ANTENNA TRANSMISSION

CROSS-REFERENCE TO RELATED APPLICATIONS

This application is the National Stage filing under 35 U.S.C. 371 of International Application No. PCT/KR2011/002153, filed on Mar. 29, 2011, which claims the benefit of earlier filing date and right of priority to Korean Patent Application No. 10-2011-0028302, filed on Mar. 29, 2011, and also claims the benefit of U.S. Provisional Application Ser. No. 61/318,780, filed on Mar. 29, 2010, U.S. Provisional Application Ser. No. 61/325,346, filed on Apr. 18, 2010, U.S. Provisional Application Ser. No. 61/353,663, filed on Jun. 11, 2010, and U.S. Provisional Application Ser. No. 61/359,280, filed on Jun. 28, 2010, the contents of which are all hereby incorporated by reference herein in their entirety.

TECHNICAL FIELD

The present invention relates to a wireless communication system, and more particularly to a method and apparatus for transmitting efficient control information to support uplink multiple input multiple output (MIMO) transmission.

BACKGROUND ART

A Multiple Input Multiple Output (MIMO) scheme refers to a scheme for improving data transmission/reception efficiency using multiple transmit antennas and multiple receive antennas, unlike a scheme using one transmit antenna and one receive antenna. That is, a transmitter or a receiver of a wireless communication system uses multiple antennas so as to increase capacity or improve performance. The MIMO scheme may be called a multiple antenna technique.

In the multiple antenna transmission technique, there are a single codeword (SCW) scheme for simultaneously transmitting N data streams using one channel encoding block and a multiple codeword (MCW) scheme for transmitting N data streams using M (here, M is always equal to or less than N) channel encoding blocks. At this time, each channel encoding block generates an independent codeword and each codeword is designed to facilitate independent error detection.

In a system for transmitting multiple codewords, a receiver needs to inform a transmitter of success/failure of detection (decoding) of each codeword. Thus, the receiver may transmit a hybrid automatic repeat request (HARQ) ACK/NACK signal for each codeword to the transmitter.

In case of uplink data transmission through a single antenna, single codeword (SCW) transmission can be supported. In addition, a synchronous HARQ scheme can be applied to single antenna uplink transmission, and an adaptive or non-adaptive HARQ scheme can be utilized according to whether a modulation and coding scheme (MCS) is changed during retransmission.

DISCLOSURE

Technical Problem

Accordingly, the present invention is directed to a method and apparatus for transmitting efficient control information to support uplink MIMO transmission, that substantially obviate one or more problems due to limitations and disadvantages of the related art.

Since the legacy 3GPP LTE system defines only HARQ operations for uplink single codeword transmission of a UE including a single antenna, there is a need to define not only HARQ operations for uplink MCW transmission and retransmission of a UE including multiple antennas, but also a method for constructing control information capable of supporting the HARQ operations.

An object of the present invention is to provide a method and apparatus for providing control information that is capable of efficiently and correctly supporting uplink MIMO transmission. In more detail, in association with HARQ operations for uplink MCW transmission, the present invention provides a method for constructing control information on a Physical Hybrid-automatic repeat request (ARQ) Indicator CHannel (PHICH), a method for selecting a precoder, a method for selecting PHICH resources, a method for selecting a demodulation reference signal (DMRS), a method for performing UE HARQ operations through a PHICH and a physical downlink control channel (PDCCH), and a method for constructing downlink control information (DCI) on a PDCCH.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Technical Solution

The object of the present invention can be achieved by providing a method for transmitting control information of uplink (UL) MIMO (Multiple Input Multiple Output) transmission by a base station (BS), the method including transmitting downlink control information (DCI) scheduling UL transmission of a plurality of transport blocks to a user equipment (UE) through a physical downlink control channel (PDCCH); receiving the plurality of transport blocks scheduled by the DCI from the user equipment (UE); transmitting information indicating acknowledgement (ACK) or negative acknowledgement (NACK) of each of the received transport blocks to the user equipment (UE) through a physical hybrid-automatic repeat request indicator channel (PHICH); and receiving retransmission of a transport block indicating NACK from the user equipment (UE), wherein, if the number of NACK transport blocks is different from the number of a plurality of transport blocks indicated by the PDCCH, a precoding matrix for the same number of transmission layers as the number of layers corresponding to the NACK transport block is used in the retransmission.

In another aspect of the present invention, a method for performing uplink (UL) MIMO (Multiple Input Multiple Output) transmission by a user equipment (UE) includes receiving downlink control information (DCI) scheduling UL transmission of a plurality of transport blocks from a base station (BS) through a physical downlink control channel (PDCCH); transmitting the plurality of transport blocks (TBs) scheduled by the DCI to the base station (BS); receiving information indicating acknowledgement (ACK) or negative acknowledgement (NACK) of each of the transmitted transport blocks from the base station (BS) through a physical hybrid-automatic repeat request indicator channel (PHICH); and transmitting retransmission of a transport block indicating NACK to the base station (BS), wherein, if the number of NACK transport blocks is different from the number of a plurality of transport blocks indicated by the PDCCH, a precoding matrix for the same number of transmission layers as the number of layers corresponding to the NACK transport block is used in the retransmission.

In another aspect of the present invention, a base station (BS) for transmitting control information of uplink (UL) MIMO (Multiple Input Multiple Output) transmission includes a reception module for receiving an uplink signal from a user equipment (UE); a transmission module for transmitting a downlink signal to the user equipment (UE); and a processor for controlling the base station (BS) including the reception module and the transmission module, wherein the processor enables the transmission module to transmit downlink control information (DCI) scheduling UL transmission of a plurality of transport blocks to a user equipment (UE) through a physical downlink control channel (PDCCH), enables the reception module to receive the plurality of transport blocks scheduled by the DCI from the user equipment (UE), enables the transmission module to transmit information indicating acknowledgement (ACK) or negative acknowledgement (NACK) of each of the received transport blocks to the user equipment (UE) through a physical hybrid-automatic repeat request indicator channel (PHICH), and enables the reception module to receive retransmission of a transport block indicating NACK from the user equipment (UE), wherein, if the number of NACK transport blocks is different from the number of a plurality of transport blocks indicated by the PDCCH, a precoding matrix for the same number of transmission layers as the number of layers corresponding to the NACK transport block is used in the retransmission.

In another aspect of the present invention, a user equipment (UE) for performing uplink (UL) MIMO (Multiple Input Multiple Output) transmission includes a reception module for receiving a downlink signal from a base station (BS); a transmission module for transmitting an uplink signal to the base station (BS); and a processor for controlling the user equipment (UE) including the reception module and the transmission module, wherein the processor enables the reception module to receive downlink control information (DCI) scheduling UL transmission of a plurality of transport blocks from the base station (BS) through a physical downlink control channel (PDCCH), enables the transmission module to transmit the plurality of transport blocks (TBs) scheduled by the DCI to the base station (BS), enables the reception module to receive information indicating acknowledgement (ACK) or negative acknowledgement (NACK) of each of the transmitted transport blocks from the base station (BS) through a physical hybrid-automatic repeat request indicator channel (PHICH), and enables the transmission module to transmit retransmission of a transport block indicating NACK to the base station (BS), wherein, if the number of NACK transport blocks is different from the number of a plurality of transport blocks indicated by the PDCCH, a precoding matrix for the same number of transmission layers as the number of layers corresponding to the NACK transport block is used in the retransmission.

The following contents can be commonly applied to the above-mentioned embodiments.

The retransmission may be carried out if a PDCCH is not detected in a downlink subframe in which the UE detects the PHICH.

The precoding matrix may be a specific precoding matrix for the same number of transmission layers as the number of layers corresponding to the NACK transport block, from among a plurality of precoding matrices indicated by the most recent PDCCH.

A subframe performing the retransmission at the UE may be a fourth subframe starting from a subframe in which the UE receives the PHICH.

One PHICH resource may be allocated to one transport block (TB).

One transport block (TB) may be mapped to a single codeword, and the single codeword is mapped to one or two layers.

It is to be understood that both the foregoing general description and the following detailed description of the present invention are exemplary and explanatory and are intended to provide further explanation of the invention as claimed.

Advantageous Effects

Exemplary embodiments of the present invention have the following effects. The embodiments of the present invention can construct control information capable of supporting the HARQ operation for uplink MIMO transmission and the MCW transmission operation, etc., such that the uplink MIMO transmission can be correctly and efficiently performed. In more detail, in association with HARQ operations for uplink MCW transmission, the present invention provides a method for constructing control information on a Physical Hybrid-automatic repeat request (ARQ) Indicator CHannel (PHICH), a method for selecting a precoder, a method for selecting PHICH resources, a method for selecting a demodulation reference signal (DMRS), a method for performing UE HARQ operations through a PHICH and a physical downlink control channel (PDCCH), and a method for constructing downlink control information (DCI) on a PDCCH.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
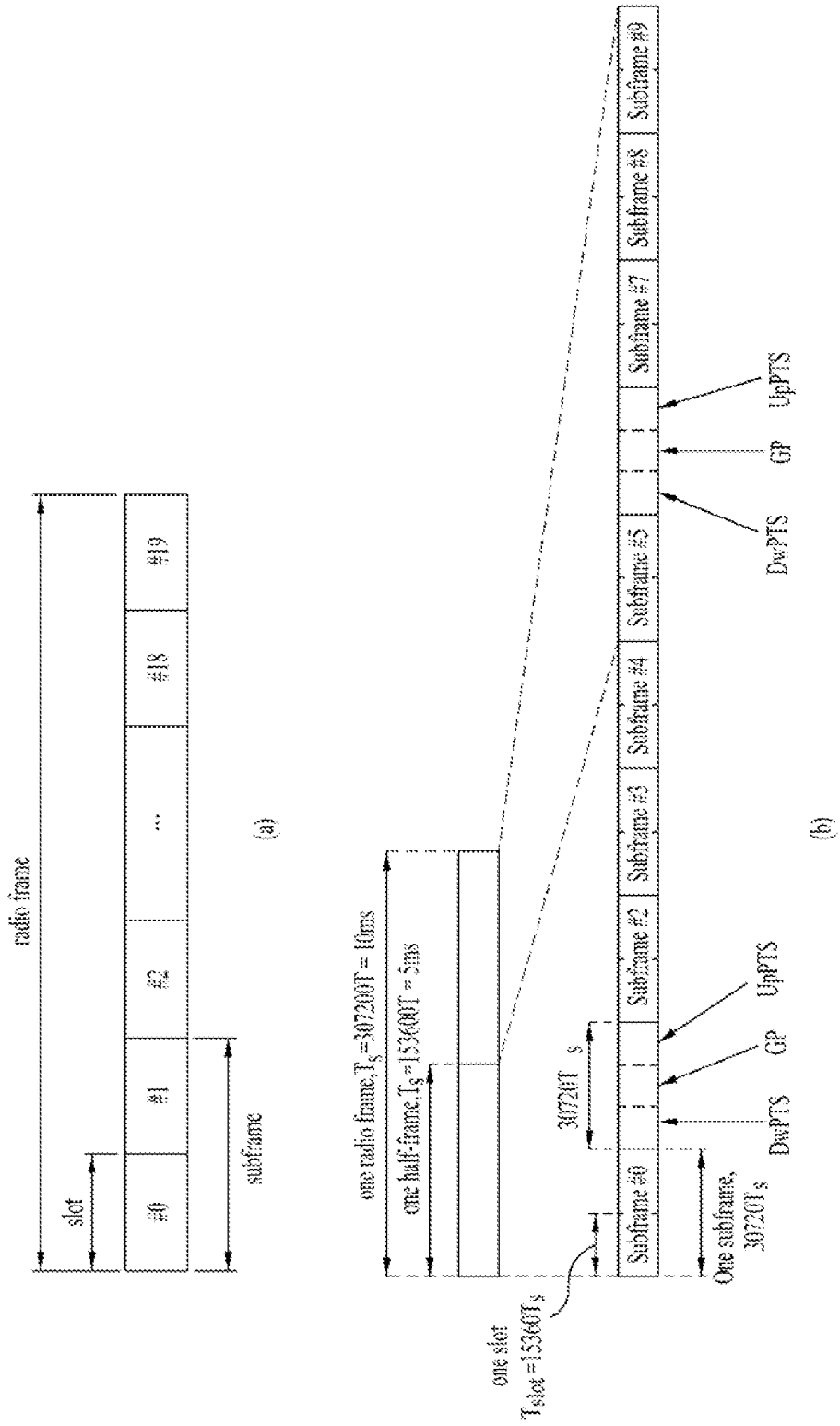
FIG. 1 is a diagram showing the structure of a downlink radio frame.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary. While the following description exemplarily uses a UE or a relay node (RN) as an uplink transmission entity and exemplarily uses a BS (eNB) or RN as an uplink reception entity, the scope or spirit of the present invention is not limited thereto. Similarly, the downlink transmission entity may be a BS or RN and the downlink reception entity may be a UE or RN. In other words, uplink transmission may indicate transmission from the UE to the BS, transmission from the UE to the RN, or transmission from the RN to the BS. Similarly, downlink transmission may indicate transmission from the BS to the UE, transmission from the BS to the RN, or transmission from the RN to the UE.

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, an LTE-Advanced (LTE-A) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. The CDMA may be embodied with wireless (or radio) technology such as UTRA (Universal Terrestrial Radio Access) or CDMA2000. The TDMA may be embodied with wireless (or radio) technology such as GSM (Global System for Mobile communications)/GPRS (General Packet Radio Service)/EDGE (Enhanced Data Rates for GSM Evolution). The OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). The UTRA is a part of the UMTS (Universal Mobile Telecommunications System). The 3GPP (3rd Generation Partnership Project) LTE (long term evolution) is a part of the E-UMTS (Evolved UMTS), which uses E-UTRA. The 3GPP LTE employs the OFDMA in downlink and employs the SC-FDMA in uplink. The LTE-Advanced (LTE-A) is an evolved version of the 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on the 3GPP LTE and 3GPP LTE-A system. However, technical features of the present invention are not limited thereto.

FIG. 1 exemplarily shows a radio frame structure for use in a 3rd Generation Partnership Project Long Term Evolution (3GPP LTE) system. A downlink (DL) radio frame structure will hereinafter be described with reference to FIG. 1.

In a cellular Orthogonal Frequency Division Multiplexing (OFDM) radio packet communication system, uplink/downlink data packet transmission is performed in subframe units. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplexing (TDD).

FIG. 1(a) is a diagram showing the structure of the type 1 radio frame. A downlink radio frame includes 10 subframes, and one subframe includes two slots in a time region. A time required for transmitting one subframe is defined in a Transmission Time Interval (TTI). For example, one subframe may have a length of 1 ms and one slot may have a length of 0.5 ms. One slot may include a plurality of OFDM symbols in a time region and include a plurality of Resource Blocks (RBs) in a frequency region. Since the 3GPP LTE system uses OFDMA in downlink, the OFDM symbol indicates one symbol duration. The OFDM symbol may be called an SC-FDMA symbol or a symbol duration. RB is a resource allocation unit and includes a plurality of contiguous carriers in one slot.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, the length of one OFDM symbol is increased, the number of OFDM symbols included in one slot is less than that of the case of the normal CP. In case of the extended CP, for example, the number of OFDM symbols included in one slot may be six. If the channel state is unstable, for example, if a User Equipment (UE) moves at a high speed, the extended CP may be used in order to further reduce interference between symbols.

In case of using the normal CP, since one slot includes seven OFDM symbols, one subframe includes 14 OFDM symbols. At this time, the first two or three OFDM symbols of each subframe may be allocated to a Physical Downlink Control Channel (PDCCH) and the remaining OFDM symbols may be allocated to a Physical Downlink Shared Channel (PDCCH).

The structure of a type 2 radio frame is shown in FIG. 1(b). The type 2 radio frame includes two half-frames, each of which is made up of five subframes, a downlink pilot time slot (DwPTS), a guard period (GP), and an uplink pilot time slot (UpPTS), in which one subframe consists of two slots. That is, one subframe is composed of two slots irrespective of the radio frame type. DwPTS is used to perform initial cell search, synchronization, or channel estimation. UpPTS is used to perform channel estimation of a base station and uplink transmission synchronization of a user equipment (UE). The guard interval (GP) is located between an uplink and a downlink so as to remove interference generated in the uplink due to multi-path delay of a downlink signal. That is, one subframe is composed of two slots irrespective of the radio frame type.

The structure of the radio frame is only exemplary. Accordingly, the number of subframes included in the radio frame, the number of slots included in the subframe or the number of symbols included in the slot may be changed in various manners.

Figure 2:
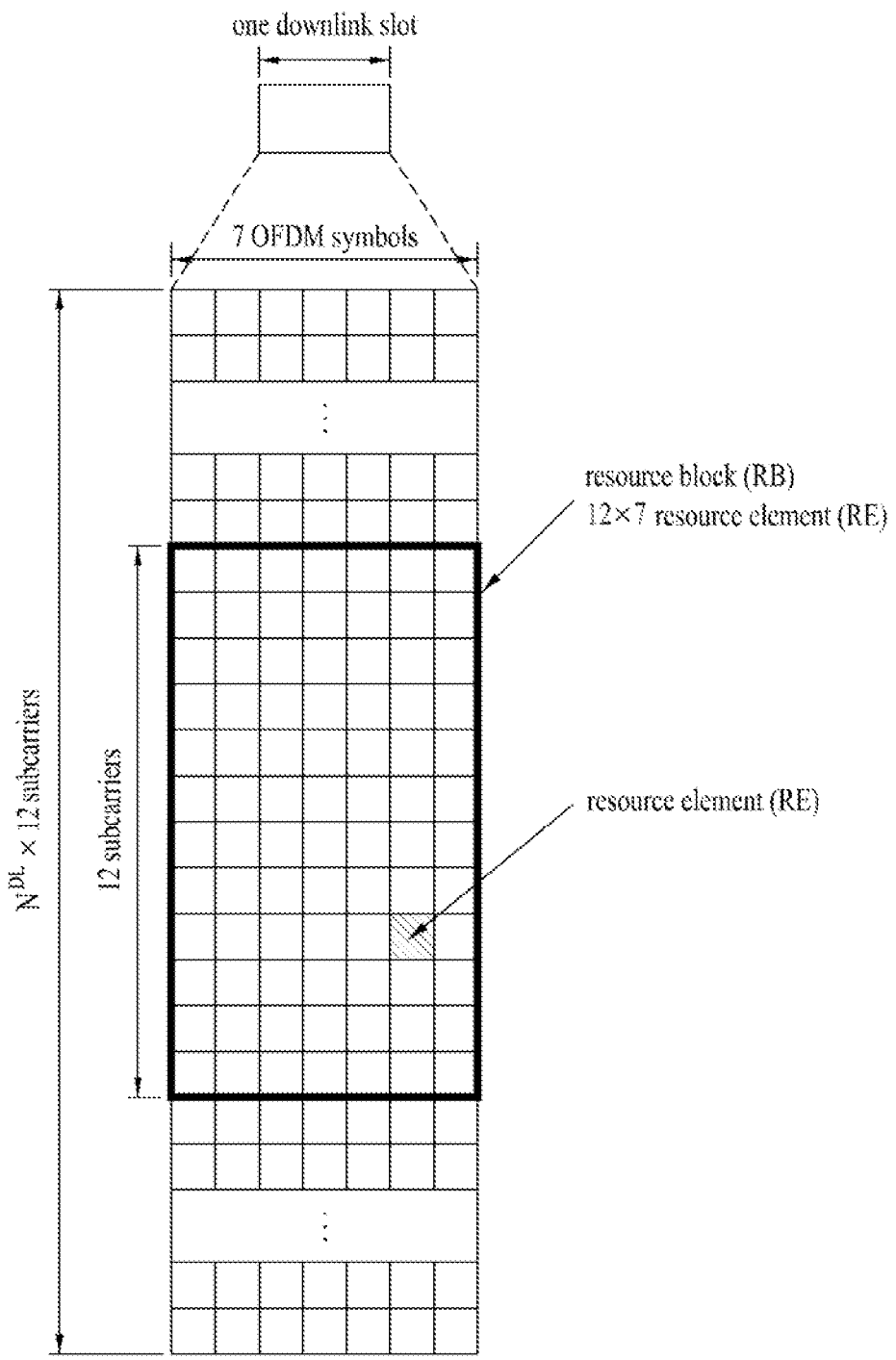
FIG. 2 is a diagram showing an example of a resource grid in one downlink slot.

FIG. 2 is a diagram showing an example of a resource grid in one downlink slot. OFDM symbols are configured by the normal CP. Referring to FIG. 2, the downlink slot includes a plurality of OFDM symbols in a time region and includes a plurality of RBs in a frequency region. Although one downlink slot includes seven OFDM symbols and one RB includes 12 subcarriers, the present invention is not limited thereto. Each element of the resource grid is referred to as a Resource Element (RE). For example, a RE a(k, l) is located at a k-th subcarrier and an 1-th OFDM symbol. In case of the normal CP, one RB includes 12×7 REs (in case of the extended CP, one RB includes 12×6 REs). Since a distance between subcarriers is 15 kHz, one RB includes about 180 kHz in the frequency region. $N^{DL}$ denotes the number of RBs included in the downlink slot. The $N^{DL}$ is determined based on downlink transmission bandwidth set by scheduling of a base station (BS).

Figure 3:
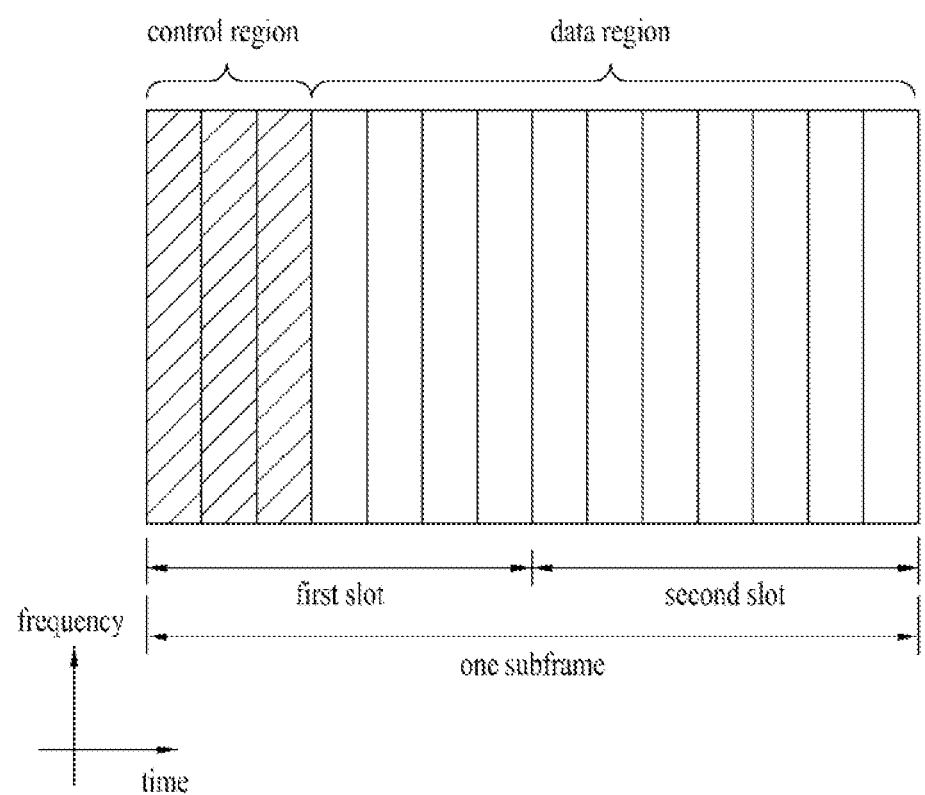
FIG. 3 is a diagram showing the structure of a downlink subframe.

FIG. 3 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. The basic unit of transmission becomes one subframe. That is, a PDCCH and a PDSCH are allocated to two slots. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response of uplink transmission. The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of an higher layer control message such as a Random Access Response (RAR) transmitted on the PDSCH, a set of transmit power control commands for individual UEs in a certain UE group, transmit power control information, activation of Voice over IP (VoIP), etc. A plurality of PDCCHs may be transmitted within the control region. The UE may monitor the plurality of PDCCHs. The PDCCHs are transmitted on an aggregation of one or several contiguous control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The base station determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
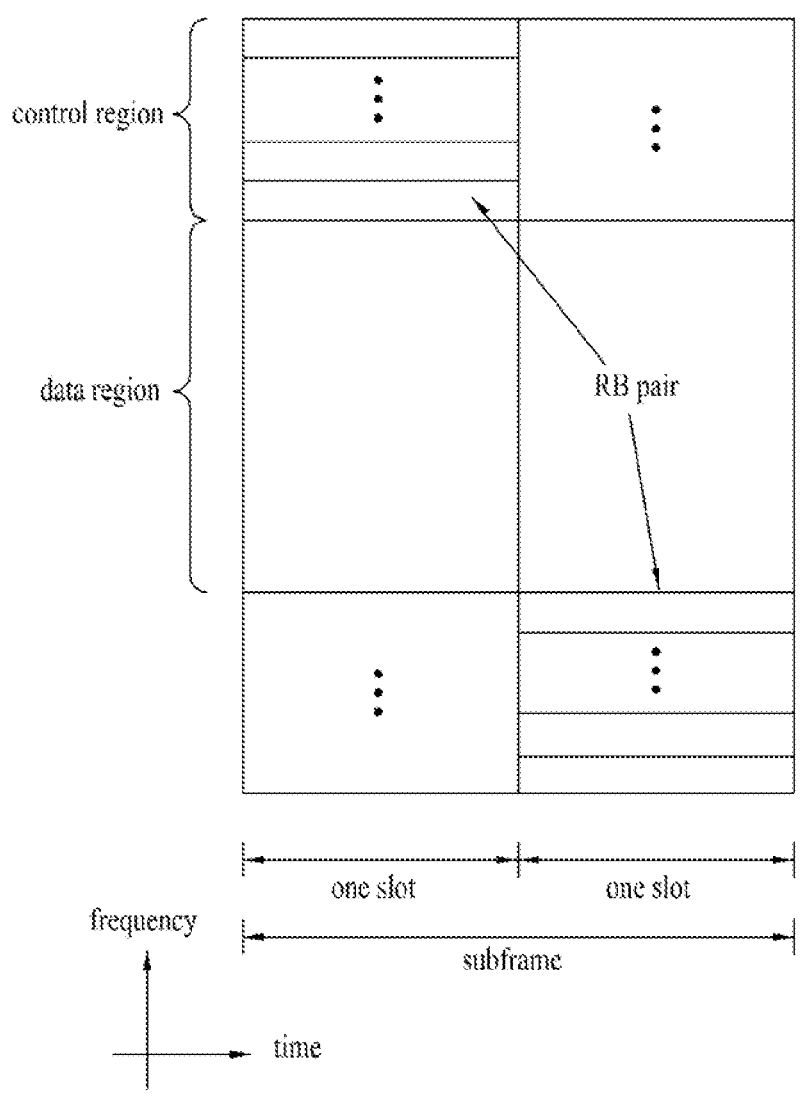
FIG. 4 is a diagram showing the structure of an uplink frame.

FIG. 4 is a diagram showing the structure of an uplink frame. The uplink subframe may be divided into a control region and a data region in a frequency region. A Physical Uplink Control Channel (PUCCH) including uplink control information is allocated to the control region. A Physical uplink Shared Channel (PUSCH) including user data is allocated to the data region. In order to maintain single carrier characteristics, one UE does not simultaneously transmit the PUCCH and the PUSCH. The PUCCH for one UE is allocated to a RB pair in a subframe. RBs belonging to the RB pair occupy different subcarriers with respect to two slots. Thus, the RB pair allocated to the PUCCH is "frequency-hopped" at a slot edge.

Carrier Aggregation

Although downlink and uplink bandwidths are different, a wireless communication system typically uses one carrier. For example, a wireless communication system having one carrier for each of the downlink and the uplink and symmetry between the downlink and uplink bandwidths may be provided based on a single carrier.

The International Telecommunication Union (ITU) requests that IMT-Advanced candidates support wider bandwidths, compared to legacy wireless communication systems. However, allocation of a wide frequency bandwidth is difficult throughout most of the world. Accordingly, a technology for efficiently using small segmented bands, known as carrier aggregation (bandwidth aggregation) or spectrum aggregation, has been developed in order to aggregate a plurality of physical bands to a logical wider band.

Carrier aggregation was introduced to support increased throughput, prevent a cost increase caused by introduction of wideband RF devices, and ensure compatibility with legacy systems. Carrier aggregation enables data exchange between a UE and an eNB through a group of carriers each having a bandwidth unit defined in a legacy wireless communication system (e.g. 3GPP LTE Release-8 or Release-9 in case of 3GPP LTE-A). The carriers each having a bandwidth unit defined in the legacy wireless communication system may be called Component Carriers (CCs) or cells. Carrier aggregation using one or more cells (or CCs) may be applied to each of the downlink and the uplink. Although one cell (or one CC) supports a bandwidth of 5 MHz, 10 MHz or 20 MHz, carrier aggregation may support a system bandwidth of up to 100 MHz by aggregating up to five cells (or five CCs) each having a bandwidth of 5 MHz, 10 MHz or 20 MHz.

Modeling of Multi-Input Multi-Output (MIMO) System

An MIMO system improves data transmission/reception efficiency using multiple transmit antennas and multiple receive antennas. In the MIMO technology, a single antenna path is not used to receive a whole message, that is, whole data may be received by combining a plurality of pieces of data received through a plurality of antennas.

Figure 5:
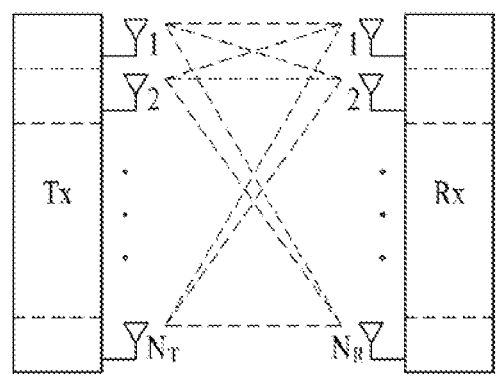
FIG. 5 is a diagram showing the configuration of a wireless communication system having multiple antennas.
Figure 5:
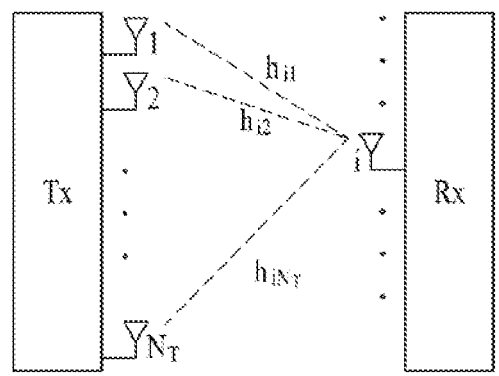

FIG. 5 is a diagram showing the configuration of a wireless communication system having multiple antennas. As shown in FIG. 5(a), if the number of transmit antennas is increased to $N_T$ and the number of receive antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate $R_0$ upon utilization of a single antenna and a rate increase ratio $R_i$.

$$R_i = \min(N_T, N_R) \qquad \text{[Equation 1]}$$

For example, in an MIMO system using four transmit antennas and four receive antennas, it is possible to theoretically acquire a transfer rate which is four times that of a single antenna system. After the increase in the theoretical capacity of the MIMO system was proved in the mid-1990s, various technologies of substantially improving a data transfer rate have been actively developed up to now. In addition, several technologies are already applied to the various radio communication standards such as the third-generation mobile communication and the next-generation wireless local area network (LAN).

According to the researches into the MIMO antenna up to now, various researches such as researches into information theory related to the computation of the communication capacity of a MIMO antenna in various channel environments and multiple access environments, researches into the model and the measurement of the radio channels of the MIMO system, and researches into space-time signal processing technologies of improving transmission reliability and transmission rate have been actively conducted.

The communication method of the MIMO system will be described in more detail using mathematical modeling. In the above system, it is assumed that $N_T$ transmit antennas and $N_R$ receive antennas are present.

In transmitted signals, if the $N_T$ transmit antennas are present, the number of pieces of maximally transmittable information is $N_T$. The transmitted information may be expressed as follows.

$$s = [s_1, s_2, \ldots, s_{N_T}]^T \qquad \text{[Equation 2]}$$

The transmitted information $s_1, s_2, \ldots, s_{N_T}$ may have different transmit powers. If the respective transmit powers are $P_1, P_2, \ldots, P_{N_T}$, the transmitted information with adjusted powers may be expressed as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

In addition, $\hat{s}$ may be expressed using a diagonal matrix P of the transmit powers as follows.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Considers that the $N_T$ actually transmitted signals $x_1, x_2, \ldots, x_{N_T}$ are configured by applying a weight matrix W to the information vector $\hat{s}$ with the adjusted transmit powers. The weight matrix W serves to appropriately distribute the transmitted information to each antenna according to a transport channel state, etc. $x_1, x_2, \ldots, x_{N_T}$ may be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \vdots \\ w_{i1} & w_{i2} & \ldots & w_{iN_T} \\ \vdots & & \ddots & \vdots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \qquad \text{[Equation 5]}$$

$$W\hat{s} = WPs$$

In Equation 5, $W_{ij}$ denotes a weight between an i-th transmit antenna and j-th information. W is also called a precoding matrix.

The transmitted signal x may be differently processed using according to two schemes (for example, spatial diversity scheme and spatial multiplexing scheme). In case of the spatial multiplexing scheme, different signals are multiplexed and the multiplexed signal is transmitted to a receiver such that elements of information vector(s) have different values. In case of the spatial diversity scheme, the same signal is repeatedly transmitted through a plurality of channel paths such that elements of information vector(s) have the same value. A combination of the spatial multiplexing scheme and the spatial diversity scheme may be considered. That is, the same signal may be, for example, transmitted through three transmit antennas according to the spatial diversity scheme and the remaining signals may be transmitted to the receiver using the spatial multiplexing scheme.

If the $N_R$ receive antennas are present, respective received signals $y_1, y_2, \ldots, y_{N_R}$ of the antennas are expressed as follows.

$$y = [y_1, y_2, \ldots, y_{N_R}]^T \quad \text{[Equation 6]}$$

If channels are modeled in the MIMO radio communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram showing channels from the $N_T$ transmit antennas to the receive antenna i. The channels may be combined and expressed in the form of a vector and a matrix. In FIG. 5(b), the channels from the $N_T$ transmit antennas to the receive antenna i may be expressed as follows.

$$h_i^T = [h_{i1}, h_{i2}, \ldots, h_{iN_T}] \quad \text{[Equation 7]}$$

Accordingly, all the channels from the $N_T$ transmit antennas to the $N_R$ receive antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2n_t} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix} \quad \text{[Equation 8]}$$

An Additive White Gaussian Noise (AWGN) is added to the actual channels after a channel matrix H. The AWGN $n_1, n_2, \ldots, n_{N_R}$ added to the $N_T$ transmit antennas may be expressed as follows.

$$n = [n_1, n_2, \ldots, n_{N_R}]^T \quad \text{[Equation 9]}$$

Through the above-described mathematical modeling, the received signals may be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

The number of rows and columns of the channel matrix H indicating the channel state is determined by the number of transmit and receive antennas. The number of rows of the channel matrix H is equal to the number $N_R$ of receive antennas and the number of columns thereof is equal to the number $N_T$ of transmit antennas. That is, the channel matrix H is an $N_R \times N_T$ matrix.

The rank of the matrix is defined by the smaller of the number of rows or columns, which are independent of each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

In MIMO transmission, the term "rank" denotes the number of paths for independently transmitting signals, and the term "number of layers" denotes the number of signal streams transmitted through each path. In general, since a transmitter transmits layers corresponding in number to the number of ranks used for signal transmission, rank has the same meaning as the number of layers unless otherwise noted.

Figure 6:
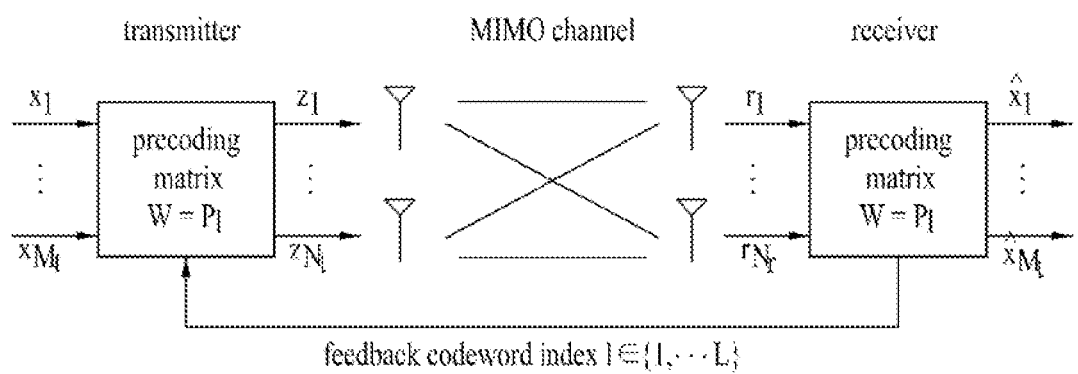
FIG. 6 is a conceptual diagram illustrating codebook-based precoding.

In association with the above-mentioned MIMO transmission techniques, the codebook-based precoding method will hereinafter be described with reference to FIG. 6. FIG. 6 is a conceptual diagram illustrating codebook-based precoding.

In accordance with the codebook-based precoding scheme, a transceiver may share codebook information including a predetermined number of precoding matrices according to a transmission rank, the number of antennas, etc. That is, if feedback information is infinite, the precoding-based codebook scheme may be used. The receiver measures a channel status through a reception signal, so that an infinite number of preferred precoding matrix information (i.e., an index of the corresponding precoding matrix) may be fed back to the transmitter on the basis of the above-mentioned codebook information. For example, the receiver may select an optimum precoding matrix by measuring an ML (Maximum Likelihood) or MMSE (Minimum Mean Square Error) scheme. Although the receiver shown in FIG. 6 transmits precoding matrix information for each codeword to the transmitter, the scope or spirit of the present invention is not limited thereto.

Upon receiving feedback information from the receiver, the transmitter may select a specific precoding matrix from a codebook on the basis of the received information. The transmitter that has selected the precoding matrix performs a precoding operation by multiplying the selected precoding matrix by as many layer signals as the number of transmission ranks, and may transmit each precoded Tx signal over a plurality of antennas.

If the receiver receives the precoded signal from the transmitter as an input, it performs inverse processing of the precoding having been conducted in the transmitter so that it can recover the reception (Rx) signal. Generally, the precoding matrix satisfies a unitary matrix (U) such as ($U^*U^H=I$), so that the inverse processing of the above-mentioned precoding may be conducted by multiplying a Hermitian matrix ($P^H$) of the precoding matrix H used in precoding of the transmitter by the reception (Rx) signal.

SC-FDMA Transmission and OFDMA Transmission

Figure 7:
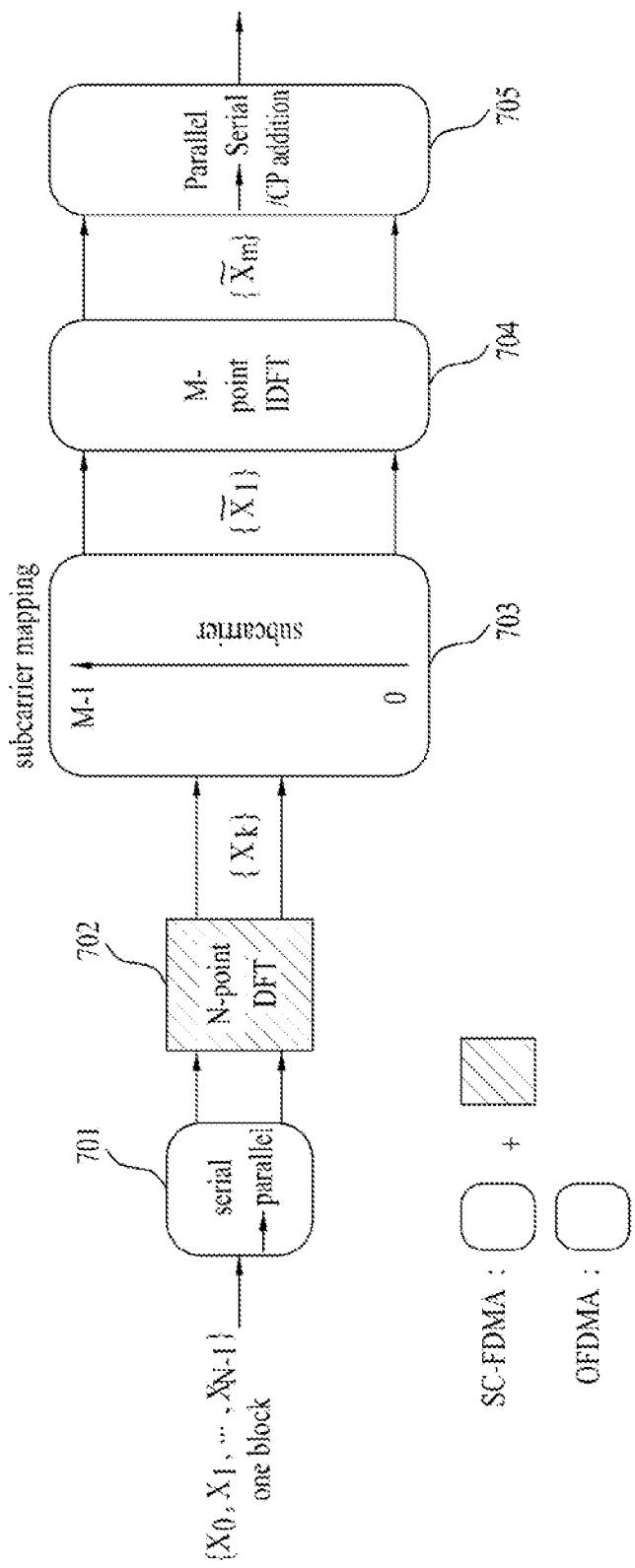
FIG. 7 is a conceptual diagram illustrating an SC-FDMA transmission scheme and an OFDMA transmission scheme.

FIG. 7 is a conceptual diagram illustrating an SC-FDMA transmission scheme and an OFDMA transmission scheme for use in a mobile communication system. The SC-FDMA transmission scheme may be used for UL transmission and the OFDMA transmission scheme may be used for DL transmission.

Each of the UL signal transmission entity (e.g., UE) and the DL signal transmission entity (e.g., eNB) may include a Serial-to-Parallel (S/P) Converter 701, a subcarrier mapper 703, an M-point Inverse Discrete Fourier Transform (IDFT) module 704, and a Parallel-to-Serial Converter 705. Each input signal that is input to the S/P converter 701 may be a channel coded and modulated data symbol. However, a user equipment (UE) for transmitting signals according to the SC-FDMA scheme may further include an N-point Discrete Fourier Transform (DFT) module 702. The influence of IDFT processing of the M-point IDFT module 704 is considerably offset, such that a transmission signal may be designed to have a single carrier property. That is, the DFT module 702 performs DFT spreading of an input data symbol such that single carrier property requisite for UL transmission may be satisfied. The SC-FDMA transmission scheme basically provides good or superior Peak to Average Power ratio (PAPR) or Cubic Metric (CM), such that the UL transmitter can more effectively transmit data or information even in the case of the power limitation situation, resulting in an increase in user throughput.

Hybrid Automatic Repeat Request (HARQ)

As a control method of data reception failure, the following HARQ operation may be applied. A data transmitter may transmit a new packet if an ACK signal is received from a receiver and retransmit the transmitted packet if a NACK signal is received, after transmitting one packet. At this time, the packet subjected to coding with forward error correction (FEC) may be retransmitted. Accordingly, the data receiver receives and decodes one packet, transmits an ACK signal if decoding is successfully performed, transmits a NACK signal if decoding fails, and stores the received packet in a buffer. If the data receiver receives the retransmitted packet due to the NACK signal, the data receiver decodes the retransmitted packet in association with the packet stored in the buffer, thereby increasing a packet reception success rate.

The HARQ scheme may be divided into a synchronous HARQ scheme and an asynchronous HARQ scheme according to retransmission timing. In the synchronous HARQ scheme, if initial transmission fails, subsequent retransmission is performed at a predetermined time set by a system. For example, if retransmission is set to be performed in every fourth time unit after initial transmission fails, information about a retransmission time does not need to be signaled to the receiver. Accordingly, if the data transmitter receives the NACK signal, the packet is retransmitted in every fourth time unit until the ACK signal is received. According to the asynchronous HARQ scheme, information about a retransmission time is separately scheduled. Accordingly, the retransmission time of the packet corresponding to the NACK signal may be changed according to various factors such as channel state.

The HARQ scheme may be divided into an adaptive HARQ scheme and a non-adaptive HARQ scheme depending on whether the amount of resources used for retransmission is set according to channel state. In the non-adaptive scheme, a packet modulation scheme, the number of used RBs, etc., which are used upon retransmission, are set in advance upon initial transmission. For example, if a transmitter transmits data using eight RBs upon initial transmission, the transmitter also retransmits data using eight RBs even upon retransmission. In contrast, in the adaptive scheme, the packet modulation scheme, the number of used RBs, etc. may be changed according to channel state. For example, even when data is transmitted using eight RBs upon initial transmission, retransmission may be performed using fewer or more than eight RBs according to channel state.

A synchronous HARQ scheme is applicable to uplink data transmission of a UE having a single antenna. A HARQ ACK/NACK signal for uplink data transmission is indicated via a PHICH or a PDCCH among downlink control channels. The non-adaptive HARQ scheme may be performed if the PHICH is used and the adaptive HARQ scheme may be performed if the PDCCH is used.

The PHICH is used to transmit 1-bit ACK/NACK information, bit state 0 means ACK and bit state 1 means NACK. The 1-bit information is modulated using a binary phase shift keying (BPSK) scheme. The non-adaptive scheme is performed if the PHICH is used and a redundancy version (RV) may be changed according to a predetermined pattern.

The PDCCH is a channel including control information for uplink/downlink data transmission. A UE may acquire uplink control information so as to perform uplink data transmission. Downlink control information (DCI) for scheduling uplink transmission may be referred to as uplink (UL) grant. Such control information may include resource allocation information, a modulation and coding scheme (MCS) level, a new data indicator (NDI), power control information, etc. The NDI has a size of 1 bit and has a bit state different from a previous NDI bit state if new data is to be transmitted. That is, the NDI value is toggled. In case of retransmission, control information having the same bit state as the NDI bit of previous control is transmitted. That is, the NDI value is not toggled. Since the MCS is indicated through the PDCCH, an adaptive HARQ scheme is possible.

In the 3GPP LTE system, an uplink HARQ scheme is defined as a synchronous HARQ scheme and a maximum number of retransmissions is configured per UE. A downlink ACK/NACK signal responding to uplink transmission/retransmission is transmitted on a PHICH. An uplink HARQ operation follows the following rules.

1) If a PDCCH indicating a C-RNTI of a UE is accurately received regardless of content of HARQ feedback (ACK or NACK), a UE may perform an operation indicated by the PDCCH, that is, transmission or retransmission (this may be referred to as adaptive retransmission).

2) If a PDCCH indicating a C-RNTI of a UE is not detected, HARQ feedback may indicate a method of performing retransmission by a UE. If HARQ feedback is NACK, the UE performs non-adaptive retransmission. That is, retransmission is performed using the same uplink resources as those previously used by the same HARQ process. If HARQ feedback is ACK, the UE does not perform uplink transmission/retransmission and keeps data in a HARQ buffer. In order to perform retransmission, indication through a PDCCH is required. That is, non-adaptive retransmission is not performed.

Meanwhile a measurement gap has higher priority than HARQ retransmission. That is, if HARQ retransmission collides with a measurement gap, HARQ retransmission is not performed.

The above-described uplink HARQ operation is summarized as shown in Table 1.

TABLE 1

| HARQ feedback received by UE | PDCCH received by UE | UE behavior |
| --- | --- | --- |
| ACK or NACK | New transmission | New transmission is performed according to the PDCCH |
| ACK or NACK | Retransmission | Retransmission is performed according to the PDCCH (adaptive retransmission) |
| ACK | None | Transmission/retransmission is not performed and data is kept in the HARQ buffer. The PDCCH is required to resume retransmission. |
| NACK | None | Non-adaptive retransmission |

For detailed description of the uplink HARQ operation, refer to the 3GPP LTE standard (e.g., 3GPP TS 36.300 V8.6.0).

In the conventional 3GPP LTE system (e.g., the 3GPP LTE release 8 system), if a multiple antenna transmission scheme is applied to uplink signal transmission from a UE to a BS, a peak-to-average ratio (PAPR)/cubic metric is deteriorated. Thus, a multiple antenna transmission scheme (MIMO transmission scheme) is defined only in downlink signal transmission from a BS to a UE. Application of a multiple antenna transmission scheme to an uplink signal transmitted from a UE to a BS has been discussed for increase in transfer rate and diversity gain, and a method of applying a multiple antenna transmission scheme to uplink signal transmission in the subsequent standard (e.g., 3GPP LTE Release-10 or subsequent release, or 3GPP LTE-A) of the 3GPP LTE system has been discussed.

In application of the multiple antenna transmission scheme to uplink signal transmission, an uplink transmitter (e.g., a UE) may have two or four transmit antennas. In order to reduce control signal overhead, a maximum of two codewords may be transmitted in uplink. In a system for transmitting multiple codewords in uplink, an uplink receiver (e.g., a BS) needs to inform the uplink transmitter (e.g., a UE) of detection (or decoding) success/failure of the codewords. The uplink receiver may transmit a HARQ ACK/NACK signal of each codeword to the uplink transmitter. With respect to uplink transmission of two codewords, a determination as to whether new data transmission or retransmission is performed depending on whether downlink HARQ feedback received by the uplink transmitter is ACK or NACK may be defined as shown in Table 2.

ACK/NACK state is represented by 1 bit and this information is transmitted on a PHICH after modulation and encoding or modulation and sequence mapping.

Multiple codewords may be used for uplink data transmission. Multiple codewords may be used for the above-described multiple antenna transmission scheme. Alternatively, multiple codewords may be used for a multiple carrier technique (or a carrier aggregation technique). In the present specification, multi-codeword transmission is applicable to a multiple antenna transmission scheme or a multiple carrier technique.

Since 1 bit of information is required to indicate an ACK/NACK state of one codeword, N bits of information is required to indicate ACK/NACK states of N codewords. For example, in a system having two codewords, a total of 2 bits is required to indicate the ACK/NACK states of the codewords. That is, each of the first and second codewords includes a state of ACK and ACK, a state of ACK and NACK, a state of NACK and ACK, or a state of NACK and NACK. Each state can be represented by 2 bits. N-bit information may be transmitted on a PHICH using various methods.

TABLE 2

| First codeword | Second codeword | Behavior (non-blanking) | Behavior (blanking) |
|---|---|---|---|
| ACK | ACK | First codeword: new data transmission<br>Second codeword: new data transmission | First codeword: new data transmission<br>Second codeword: new data transmission |
| ACK | NACK | First codeword: new data transmission<br>Second codeword: retransmission | First codeword: non-transmission/retransmission<br>Second codeword: retransmission |
| NACK | ACK | First codeword: retransmission<br>Second codeword: new data transmission | First codeword: retransmission<br>Second codeword: non-transmission/retransmission |
| NACK | NACK | First codeword: retransmission<br>Second codeword: retransmission | First codeword: retransmission<br>Second codeword: retransmission |

In a non-blank operation, new data is transmitted with respect to a codeword for which ACK is received and retransmission is performed with respect to a codeword for which NACK is received. Meanwhile, in a blanking operation, new data is transmitted with respect to two codewords if ACK is received with respect to the two codewords, and a codeword for which ACK is received is not transmitted and a codeword for which NACK is received is retransmitted if ACK is received with respect to one of the two codewords and NACK is received with respect to the other of the two codewords. If NACK is received with respect to the two codewords, the two codewords are retransmitted.

Hereinafter, in a HARQ operation for the above-described uplink multi-codeword transmission, various embodiments of the present invention of a method of configuring control information on a PHICH, a precoder selection method, a method for selecting PHICH resources, a method for selecting a DMRS resource, a method of performing the HARQ operation by a UE which receives a PHICH and a PDCCH, and a method of configuring downlink control information (DCI) on a PDCCH will be described.

1. Method of Configuring Control Information on a PHICH for Uplink Multiple-Codeword HARQ Operation As described above, a HARQ scheme for uplink data transmission is synchronously performed and a PHICH including HARQ ACK/NACK control information for uplink data transmission is transmitted after a predetermined time according to an uplink data transmission period. An uplink transmitter may determine uplink data retransmission according to an ACK/NACK state indicated by the PHICH. The In Embodiment 1-A, ACK/NACK signals for multiple codewords may be modulated using a modulation method having an order higher than that of a conventional BPSK modulation method. For example, ACK/NACK signals of two codewords may be represented by 2 bits and 2 bits may be modulated using a quadrature phase shift keying (QPSK) scheme. When more bits are required to represent the ACK/NACK states as in transmission of two or more codewords, a modulation scheme such as N-PSK or N-Quadrature amplitude modulation (QAM) may be utilized. If a QPSK scheme is used, points of a total of four states may be represented by 1+j, 1−j, −1−j and −1+j. Alternatively, QPSK may be represented by 1, −1, j and −j. In the QPSK scheme, each point may be subjected to power normalization.

In Embodiment 1-B, ACK/NACK signals for multiple codewords may be transmitted on multiple PHICHs. Each PHICH may include 1 bit of ACK/NACK information of one codeword. For example, with respect to two codewords, ACK/NACK information may be transmitted on two PHICHs.

In Embodiment 1-C, ACK/NACK signals for multiple codewords may be represented by 1 bit on one PHICH. Only one of the ACK and NACK signals can be represented by 1 bit. For example, if two codewords are successfully decoded, ACK is transmitted and, if decoding of any one of the two codewords fails, NACK is transmitted. In another example, if any one of the two codewords is successfully decoded, ACK is transmitted and, if decoding of the two codewords fails, NACK is transmitted.

A method for performing uplink MCW HARQ retransmission according to a PHICH will hereinafter be described in detail.

It is assumed that, under the condition that a PDCCH providing uplink transmission scheduling information is not detected, a UE can perform the HARQ operation using information indicated by a PHICH. In this case, various embodiments for the MCW retransmission operation in uplink MIMO transmission will hereinafter be described in detail.

For example, if multiple PHICHs are transmitted with respect to uplink MCW transmission, a retransmission operation according to an ACK/NACK state of each codeword may be defined as shown in Table 3. An uplink transmitter (e.g., a UE) performs retransmission only with respect to a codeword for which NACK is received and does not retransmit a codeword for which ACK is received. If ACK is received with respect to the two codewords, the two codewords are not transmitted.

TABLE 3

| First codeword | Second codeword | Uplink transmitter behavior |
| --- | --- | --- |
| ACK | ACK | First codeword: non-transmission/retransmission (PDCCH is required to resume retransmission) Second codeword: non-transmission/retransmission (PDCCH is required to resume retransmission |
| ACK | NACK | First codeword: non-transmission/retransmission (PDCCH is required to resume retransmission) Second codeword: retransmission (non-adaptive) |
| NACK | ACK | First codeword: retransmission (non-adaptive) Second codeword: non-transmission/retransmission (PDCCH is required to resume retransmission |
| NACK | NACK | First codeword: retransmission (non-adaptive) Second codeword: retransmission (non-adaptive) |

In Table 3, no signal is transmitted in a codeword corresponding to non-transmission/retransmission. That is, a null signal is transmitted. A codeword (CW) having a NACK state transmits a signal, and a codeword (CW) having an ACK state transmits no signal.

The operation of the codeword (or transport block TB) having an ACK state may be represented by transmission of no signal, or may be represented by setting of a zero transport block (zero TB).

Meanwhile, if only one of two codewords is retransmitted, precoder power may be scaled up at a predetermined rate in consideration of the number of layers mapped to a codeword that does not transmit a signal.

A precoder applied to uplink MCW transmission according to the present invention will hereinafter be described in detail.

2. Precoder for Use in Uplink MIMO Transmission

As described above, an uplink MIMO transmission scheme can be applied to a 3GPP LTE-A (LTE Release-10) system, so that uplink transmission throughput of the 3GPP LTE-A (LTE Release-10) system can be increased. A scheme for transmitting multiple transmission streams or multiple transmission layers on a single arbitrary UE for spatial multiplexing may be used as a technique applicable to UL MIMO transmission. In brief, the above-mentioned scheme can be referred to as a single user MIMO (SU-MIMO) scheme. In the UL SU-MIMO scheme, link adaptation may be applied to each transmission stream or each transmission stream group. A distinctive modulation and coding scheme (MCS) may be applied for such link adaptation. For this purpose, MCW-based transmission can be carried out in uplink.

The MIMO structure using multiple codewords (MCW) may consider simultaneous transmission of a maximum of two codewords. For such MIMO transmission, MCS information used by the transmitter, a new data indicator (NDI) as to whether data to be transmitted is new data or retransmission data, and redundancy version (RV) information as to which subpacket is retransmitted in case of retransmission may be needed. MCS, NDI, RV information, etc. may be defined per transport block (TB).

A plurality of transport blocks (TBs) may be mapped to a plurality of codewords according to a transport block-to-codeword mapping rule. For example, it is assumed that two TBs are represented by TB1 and TB2, respectively, and two codewords are represented by CW0 and CW1, respectively. If two TBs (TB1 and TB2) are activated, the first TB (TB1) may be mapped to a first codeword (CW0) and the second TB (TB2) may be mapped to a second codeword (CW1). Alternatively, TB1 may be mapped to CW1 and TB2 may be mapped to CW0 according to a TB-to-CW swap flag. On the other hand, if one of two TBs is deactivated and the other one is activated, one activated TB may be mapped to the first codeword (CW0). That is, TB and CW may be mapped to each other on a one to one basis. In addition, TB deactivation may include an exemplary TB having a size of 0. If the size of TB is set to 0, the corresponding TB is not mapped to a codeword.

Figure 8:
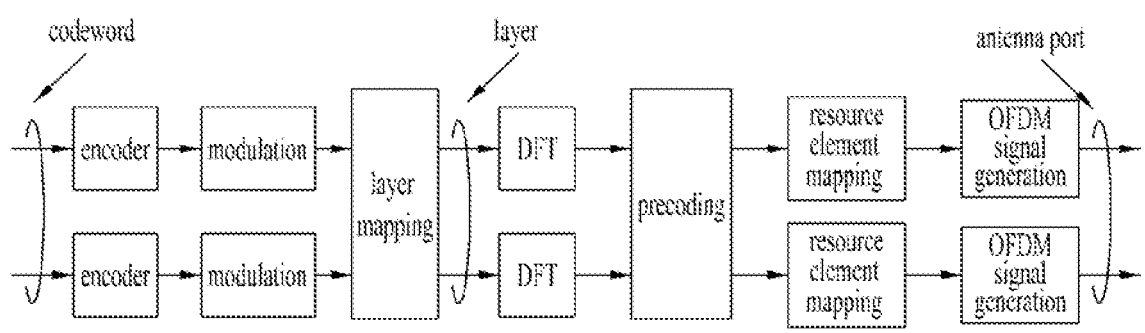
FIG. 8 is a block diagram illustrating MIMO transmission based on uplink multiple codewords.

FIG. 8 is a block diagram illustrating MIMO transmission based on multiple uplink codewords.

One or more codewords having been encoded by the encoder may be scrambled using a specific scrambling signal. The scrambled codewords may be modulated into a complex symbol using BPSK (Binary Phase Shift Keying), QPSK (Quadrature Phase Shift Keying), or 16QAM or 64QAM (Quadrature Amplitude Modulation). Thereafter, the modulated complex symbol is mapped to one or more layers. If a signal is transmitted using a single antenna, one codeword is mapped to one layer and then transmitted. However, if a signal is transmitted using multiple antennas, the codeword-to-layer mapping relationship as shown in the following tables 4 and 5 is used according to a transmission scheme.

TABLE 4

| Number of layers | Number of code words | Codeword-to-layer mapping $i = 0, 1, \ldots, M_{symb}^{layer} - 1$ | |
| --- | --- | --- | --- |
| 1 | 1 | $x^{(0)}(i) = d^{(0)}(i)$ | $M_{symb}^{layer} = M_{symb}^{(0)}$ |
| 2 | 2 | $x^{(0)}(i) = d^{(0)}(i)$ $x^{(1)}(i) = d^{(1)}(i)$ | $M_{symb}^{layer} = M_{symb}^{(0)} = M_{symb}^{(1)}$ |
| 2 | 1 | $x^{(0)}(i) = d^{(0)}(2i)$ $x^{(1)}(i) = d^{(0)}(2i+1)$ | $M_{symb}^{layer} = M_{symb}^{(0)}/2$ |
| 3 | 2 | $x^{(0)}(i) = d^{(0)}(i)$ $x^{(1)}(i) = d^{(1)}(2i)$ $x^{(2)}(i) = d^{(1)}(2i+1)$ | $M_{symb}^{layer} = M_{symb}^{(0)} = M_{symb}^{(1)}/2$ |
| 4 | 2 | $x^{(0)}(i) = d^{(0)}(2i)$ $x^{(1)}(i) = d^{(0)}(2i+1)$ $x^{(2)}(i) = d^{(1)}(2i)$ $x^{(3)}(i) = d^{(1)}(2i+1)$ | $M_{symb}^{layer} = M_{symb}^{(0)}/2 = M_{symb}^{(1)}/2$ |

TABLE 5

| Number of layers | Number of code words | Codeword-to-layer mapping $i = 0, 1, \ldots, M_{symb}^{layer} - 1$ | |
|---|---|---|---|
| 2 | 1 | $x^{(0)}(i) = d^{(0)}(2i)$ <br> $x^{(1)}(i) = d^{(0)}(2i + 1)$ | $M_{symb}^{layer} = M_{symb}^{(0)}/2$ |
| 4 | 1 | $x^{(0)}(i) = d^{(0)}(4i)$ <br> $x^{(1)}(i) = d^{(0)}(4i + 1)$ <br> $x^{(2)}(i) = d^{(0)}(4i + 2)$ <br> $x^{(3)}(i) = d^{(0)}(4i + 3)$ | $M_{symb}^{layer} = \begin{cases} M_{symb}^{(0)}/4 & \text{if } M_{symb}^{(0)} \bmod 4 = 0 \\ (M_{symb}^{(0)} + 2)/4 & \text{if } M_{symb}^{(0)} \bmod 4 \neq 0 \end{cases}$ |

If $M_{symb}^{(0)} \bmod 4 \neq 0$ two null symbols shall be appended to $d^{(0)} (M_{symb}^{(0)} - 1)$ Table 4 shows an exemplary case in which a signal is transmitted using spatial multiplexing. Table 5 shows an exemplary case in which a signal is transmitted using a transmit diversity scheme. In Tables 4 and 5, $x^{(a)}$ (i) denotes an i-th symbol of a layer having an index (a), and $d^{(a)}$ (i) denotes an i-th symbol of a codeword having an index (a). The relationship of mapping the number of codewords to the number of layers can be recognized through "Number of layers" of Table 4 and "Number of codewords" of Table 5, and a method for mapping symbols of each codeword to a layers can be recognized through the "codeword-to-Layer mapping" item.

As can be seen from Tables 4 and 5, although one codeword can be mapped to one layer in units of a symbol and then transmitted, one codeword may be distributed and mapped to a maximum of four layers as shown in the second case of Table 5. In this way, if one codeword is distributed and mapped to a plurality of layers, it can be recognized that symbols contained in each codeword are sequentially mapped to individual layers and transmitted. On the other hand, a single encoder block and a single modulation block can be used for SCW-based transmission.

As described above, Discrete Fourier Transform (DFT) can be applied to a signal mapped to a layer. In addition, a predetermined precoding matrix can be multiplied by the layer-mapped signal, and then allocated to each transmit antenna. In order to apply predetermined precoding to a DFT-s-OFDMA structure without increasing a transmission PAPR (or CM) of a UE, the precoding can be performed in a frequency domain after completion of DFT application.

The processed transmission signal for each antenna is mapped to time-frequency resource elements to be used for transmission, and is then transmitted through each antenna after passing through an OFDM signal generator.

For correct uplink MIMO transmission, the following processes can be performed. First of all, a UE transmits a reference signal to a BS, and the BS can obtain UL spatial channel information from the UE through the received reference signal. Based on the obtained spatial channel information, the BS selects a rank suitable for UL transmission, obtains a precoding weight, and calculates channel quality information (CQI). The BS can information the UE of control information for UL signal transmission. The control information may include UL transmission resource allocation information, MIMO information (rank, precoding weight, etc.), MCS level, HARQ information (e.g., RV, NDI, etc.), and sequence information for UL DMRS. The UE can transmit a UL signal using the above-mentioned control information received from the BS. Control information for UL transmission can be transmitted to a UE through DCI format fields of a UL grant PDCCH.

Precoding for UL MIMO transmission shown in FIG. 8 will hereinafter be described in detail. The term "precoding" indicates a step for combining a weight vector or a weight matrix with a transmission signal so as to transmit a signal through a spatial channel. Through the precoding block of FIG. 8, a transmit diversity or long-term beamforming scheme, a precoded spatial multiplexing scheme, etc. can be implemented. In order to efficiently support the precoding spatial multiplexing scheme, the precoding weight can be configured in the form of a codebook. Tables 6 to 10 exemplarily illustrate codebooks used for preventing a CM from increasing in UL transmission.

Table 6 exemplarily shows the precoding codebook for use in the UL spatial multiplexing transmission scheme using two transmit antennas. In the case of using two transmit antennas, one of a total of 6 precoding matrices may be used for Rank-1 transmission, and one precoding matrix may be used for Rank-2 transmission.

TABLE 6

| Codebook Index | Number of layers v | |
|---|---|---|
| | 1 | 2 |
| 0 | $\frac{1}{\sqrt{2}}\begin{bmatrix} 1 \\ 1 \end{bmatrix}$ | $\frac{1}{\sqrt{2}}\begin{bmatrix} 1 & 0 \\ 0 & 1 \end{bmatrix}$ |
| 1 | $\frac{1}{\sqrt{2}}\begin{bmatrix} 1 \\ -1 \end{bmatrix}$ | |
| 2 | $\frac{1}{\sqrt{2}}\begin{bmatrix} 1 \\ j \end{bmatrix}$ | |
| 3 | $\frac{1}{\sqrt{2}}\begin{bmatrix} 1 \\ -j \end{bmatrix}$ | — |
| 4 | $\frac{1}{\sqrt{2}}\begin{bmatrix} 1 \\ 0 \end{bmatrix}$ | |
| 5 | $\frac{1}{\sqrt{2}}\begin{bmatrix} 0 \\ 1 \end{bmatrix}$ | |

In Table 6, the precoding matrix indicating codebook indexes 4 and 5 for Rank-1 transmission can be used as a vector for turning off transmission through a certain antenna so as to cope with an antenna gain imbalance (AGI) situation.

Table 7 shows precoding matrices that are contained in a precoding codebook having the size of 6 bits applicable to transmission of one layer (i.e., Rank-1 transmission) in the UL spatial multiplexing transmission scheme using four transmit antennas. One of a total of 24 precoding matrices can be applied to 4-Tx-antenna Rank-1 transmission.

TABLE 7

Codebook

| Index 0 to 7 | $\frac{1}{2}\begin{bmatrix}1\\1\\1\\-1\end{bmatrix}$ | $\frac{1}{2}\begin{bmatrix}1\\1\\j\\j\end{bmatrix}$ | $\frac{1}{2}\begin{bmatrix}1\\1\\-1\\1\end{bmatrix}$ | $\frac{1}{2}\begin{bmatrix}1\\1\\-j\\-j\end{bmatrix}$ | $\frac{1}{2}\begin{bmatrix}1\\j\\1\\j\end{bmatrix}$ | $\frac{1}{2}\begin{bmatrix}1\\j\\j\\1\end{bmatrix}$ | $\frac{1}{2}\begin{bmatrix}1\\j\\-1\\-j\end{bmatrix}$ | $\frac{1}{2}\begin{bmatrix}1\\j\\-j\\-1\end{bmatrix}$ |
| Index 8 to 15 | $\frac{1}{2}\begin{bmatrix}1\\-1\\1\\1\end{bmatrix}$ | $\frac{1}{2}\begin{bmatrix}1\\-1\\j\\-j\end{bmatrix}$ | $\frac{1}{2}\begin{bmatrix}1\\-1\\-1\\-1\end{bmatrix}$ | $\frac{1}{2}\begin{bmatrix}1\\-1\\-j\\j\end{bmatrix}$ | $\frac{1}{2}\begin{bmatrix}1\\-j\\1\\-j\end{bmatrix}$ | $\frac{1}{2}\begin{bmatrix}1\\-j\\j\\-1\end{bmatrix}$ | $\frac{1}{2}\begin{bmatrix}1\\-j\\-1\\j\end{bmatrix}$ | $\frac{1}{2}\begin{bmatrix}1\\-j\\-j\\1\end{bmatrix}$ |
| Index 16 to 23 | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ |

The precoding matrices indicated by codebook indexes 16 to 23 shown in Table 7 may be used as a vector for turning off transmission through a certain antenna so as to cope with an antenna gain imbalance (AGI) situation.

Table 8 shows precoding matrices that are contained in a precoding codebook applicable to transmission of two layers (i.e., Rank-2 transmission) in the UL spatial multiplexing transmission scheme using 4 Tx antennas. One of a total of 16 precoding matrices can be applied to 4-Tx-antenna Rank-2 transmission.

TABLE 8

Codebook

| Index 0 to 3 | $\frac{1}{2}\begin{bmatrix}1&0\\1&0\\0&1\\0&-j\end{bmatrix}$ | $\frac{1}{2}\begin{bmatrix}1&0\\1&0\\0&1\\0&j\end{bmatrix}$ | $\frac{1}{2}\begin{bmatrix}1&0\\-j&0\\0&1\\0&1\end{bmatrix}$ | $\frac{1}{2}\begin{bmatrix}1&0\\-j&0\\0&1\\0&-1\end{bmatrix}$ |
| Index 4 to 7 | $\frac{1}{2}\begin{bmatrix}1&0\\-1&0\\0&1\\0&-j\end{bmatrix}$ | $\frac{1}{2}\begin{bmatrix}1&0\\-1&0\\0&1\\0&j\end{bmatrix}$ | $\frac{1}{2}\begin{bmatrix}1&0\\j&0\\0&1\\0&1\end{bmatrix}$ | $\frac{1}{2}\begin{bmatrix}1&0\\j&0\\0&1\\0&-1\end{bmatrix}$ |
| Index 8 to 11 | $\frac{1}{2}\begin{bmatrix}1&0\\0&1\\1&0\\0&1\end{bmatrix}$ | $\frac{1}{2}\begin{bmatrix}1&0\\0&1\\1&0\\0&-1\end{bmatrix}$ | $\frac{1}{2}\begin{bmatrix}1&0\\0&1\\-1&0\\0&1\end{bmatrix}$ | $\frac{1}{2}\begin{bmatrix}1&0\\0&1\\-1&0\\0&-1\end{bmatrix}$ |
| Index 12 to 15 | $\frac{1}{2}\begin{bmatrix}1&0\\0&1\\0&1\\1&0\end{bmatrix}$ | $\frac{1}{2}\begin{bmatrix}1&0\\0&1\\0&-1\\1&0\end{bmatrix}$ | $\frac{1}{2}\begin{bmatrix}1&0\\0&1\\0&1\\-1&0\end{bmatrix}$ | $\frac{1}{2}\begin{bmatrix}1&0\\0&1\\0&-1\\-1&0\end{bmatrix}$ |

Table 9 shows precoding matrices that are contained in a precoding codebook applicable to transmission of three layers (i.e., Rank-3 transmission) in the UL spatial multiplexing transmission scheme using 4 Tx antennas. One of a total of 12 precoding matrices can be applied to 4-Tx-antenna Rank-3 transmission.

TABLE 9

Codebook

| Index 0 to 3 | $\frac{1}{2}\begin{bmatrix}1&0&0\\1&0&0\\0&1&0\\0&0&1\end{bmatrix}$ | $\frac{1}{2}\begin{bmatrix}1&0&0\\-1&0&0\\0&1&0\\0&0&1\end{bmatrix}$ | $\frac{1}{2}\begin{bmatrix}1&0&0\\0&1&0\\1&0&0\\0&0&1\end{bmatrix}$ | $\frac{1}{2}\begin{bmatrix}1&0&0\\0&1&0\\-1&0&0\\0&0&1\end{bmatrix}$ |
| Index 4 to 7 | $\frac{1}{2}\begin{bmatrix}1&0&0\\0&1&0\\0&0&1\\1&0&0\end{bmatrix}$ | $\frac{1}{2}\begin{bmatrix}1&0&0\\0&1&0\\0&0&1\\-1&0&0\end{bmatrix}$ | $\frac{1}{2}\begin{bmatrix}0&1&0\\1&0&0\\1&0&0\\0&0&1\end{bmatrix}$ | $\frac{1}{2}\begin{bmatrix}0&1&0\\1&0&0\\-1&0&0\\0&0&1\end{bmatrix}$ |
| Index 8 to 11 | $\frac{1}{2}\begin{bmatrix}0&1&0\\1&0&0\\0&0&1\\1&0&0\end{bmatrix}$ | $\frac{1}{2}\begin{bmatrix}0&1&0\\1&0&0\\0&0&1\\-1&0&0\end{bmatrix}$ | $\frac{1}{2}\begin{bmatrix}0&1&0\\0&0&1\\1&0&0\\1&0&0\end{bmatrix}$ | $\frac{1}{2}\begin{bmatrix}0&1&0\\0&0&1\\1&0&0\\-1&0&0\end{bmatrix}$ |

Table 10 shows precoding matrices that are contained in a precoding codebook applicable to transmission of four layers (i.e., Rank-4 transmission) in the UL spatial multiplexing transmission scheme using 4 Tx antennas. Only one precoding matrix can be applied to 4-Tx-antenna Rank-4 transmission.

TABLE 10

Codebook

| Index 0 | $\frac{1}{2}\begin{bmatrix}1&0&0&0\\0&1&0&0\\0&0&1&0\\0&0&0&1\end{bmatrix}$ |

In the meantime, if transmission of two TBs (or two codewords) is indicated by a UL grant PDCCH, the precoder to be applied to such UL transmission can be indicated. If the UE transmits two TBs according to a UL grant, a PHICH from the BS can assume that one TB (or one codeword) is successfully decoded (i.e., ACK) and the other TB (or the other codeword) fails in decoding (i.e., NACK). In this case, a successfully transmitted transport block TB (or CW) may be set to a zero transport block, and retransmission of a transport block TB (or CW) having failed transmission may be attempted. In this case, in association with transmission of two TBs, the precoder indicated by a UL grant can be applied to transmission of one TB. That is, the precoder indicated by the UL grant is selected to transmit multiple TBs (or multiple codewords). In case of retransmission, one TB (or one CW) is not transmitted and the other TB (or CW) is transmitted, so that some columns from among the precoder indicated by the UL grant can be applied to data transmission. In other words, data transmission (i.e., retransmission of the other one TB) can be carried out using only a subset of the precoder indicated by the UL grant.

Embodiment 2-A

In accordance with Embodiment 2-A, the subset of a precoder used for retransmission of a codeword corresponding to NACK can be determined in UL two-codewords transmission.

Figure 9:
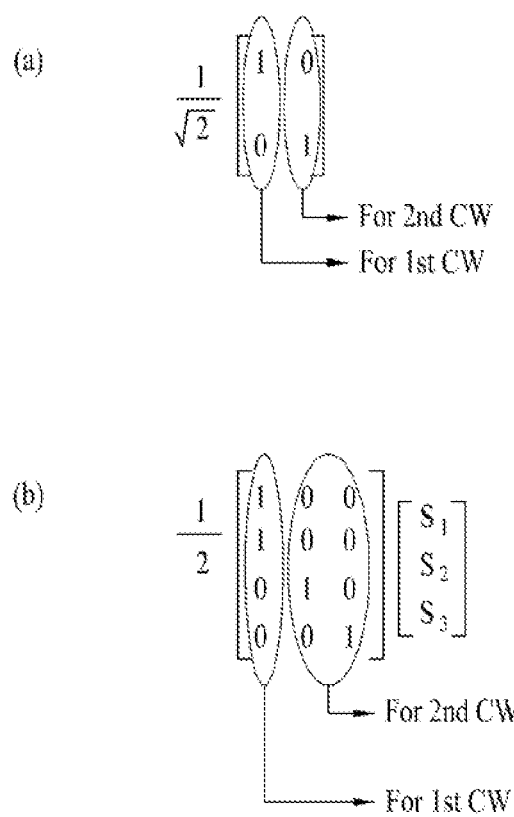
FIG. 9 is a conceptual diagram illustrating uplink MIMO transmission using a precoder subset.

For example, for Rank-2 UL MIMO transmission using 2 Tx antennas, an identity matrix shown in FIG. 9(a) may be used. In this case, two TBs (or two CWs) can be transmitted by the UL grant. Assuming that TB1 is mapped to CW1 and TB2 is mapped to CW2, one column of the precoder shown in FIG. 9(a) may be used for CW1 and the other column may be used for CW2. In association with two TBs (or two CWs), if ACK is indicated for one TB (or CW) through a PHICH and NACK is indicated for the other TB (or CW) through a PHICH, only TB (or CW) indicated by NACK can be retransmitted. In case of retransmission, the precoder (for example, the precoder shown in FIG. 9(a)) indicated by the UL grant can be used. In this case, the precoder subset can be used from the viewpoint of a precoder operation. For example, assuming that TB1 is mapped to CW1 and TB2 is mapped to CW2, only CW2 can be retransmitted if ACK is indicated for TB1 and NACK is indicated for TB2. In this case, a value of a second column acting as the precoder subset shown in FIG. 9(a) can be used for UL data transmission. The above-mentioned operation can be represented by the following equation 12.

$$\frac{1}{\sqrt{2}}\begin{bmatrix} 1 & 0 \\ 0 & 1 \end{bmatrix}\begin{bmatrix} S_1 \\ S_2 \end{bmatrix} \rightarrow \frac{1}{\sqrt{2}}\begin{bmatrix} 1 & 0 \\ 0 & 1 \end{bmatrix}\begin{bmatrix} 0 \\ S_2 \end{bmatrix} = \frac{1}{\sqrt{2}}\begin{bmatrix} 0 \\ 1 \end{bmatrix}S_2 \quad \text{[Equation 12]}$$

In Equation 12, assuming that a null signal (i.e., 0) is transmitted in one TB (or one CW) from among two UL TBs (or two UL CWs), it is possible to obtain the same result as in the case in which only a second column of the precoder is used.

In another example, the matrices shown in FIG. 9(b) can be used for Rank-3 UL MIMO transmission through 4 Tx antennas. If transmission of two TBs is indicated by the UL grant, two TBs may be mapped to two CWs, respectively. As can be seen from FIG. 9(b), some columns of the precoder may be used for one CW, and the remaining columns may be used for the other CW. In association with two TBs transmitted on uplink, the UE can receive ACK/NACK signals over a PHICH. If ACK is indicated for one certain CW and NACK is indicated for the other one CW, the CW for ACK is not transmitted and the CW for NACK can be retransmitted. Even in the case of retransmission, the precoder (for example, the precoder of FIG. 9(b)) indicated through the UL grant can be utilized. From the viewpoint of the precoder operation, it can be recognized that the precoder subset is used. The column mapped to CW used for transmission is used for UL data transmission. That is, the values of the $2^{nd}$ and $3^{rd}$ columns acting as the precoder subsets may be used for UL data transmission. The above-mentioned operation can be represented by Equation 13.

$$\frac{1}{2}\begin{bmatrix} 1 & 0 & 0 \\ 1 & 0 & 0 \\ 0 & 1 & 0 \\ 0 & 0 & 1 \end{bmatrix}\begin{bmatrix} 0 \\ S_2 \\ S_3 \end{bmatrix} = \frac{1}{2}\begin{bmatrix} 0 & 0 \\ 0 & 0 \\ 1 & 0 \\ 0 & 1 \end{bmatrix}\begin{bmatrix} S_2 \\ S_3 \end{bmatrix} \quad \text{[Equation 13]}$$

In Equation 13, assuming that a null signal (i.e., 0) is transmitted in one TB (or one CW) from among two UL TBs (or two UL CWs), it may be possible to obtain the same result as in the case in which only the second and third columns of the precoder are used.

Embodiment 2-B

In accordance with Embodiment 2-B, the precoder used for UL retransmission can be determined.

As described above, the precoder for UL transmission may be indicated by the UL grant. In this case, information indicating an MCS level for TB (or CW) and information indicating retransmission or new data transmission may be contained in the UL grant. If multiple TBs (or multiple CWs) are transmitted, retransmission or new data transmission can be performed for the corresponding TB according to NDI indication.

In addition, the UL grant may be identified by HARQ process number.

For example, the precoder indicated by the UL grant (e.g., a UL grant received before scheduling initial transmission) having the same HARQ process number can be used for retransmission.

In other words, assuming that a precoder is used if UL MIMO transmission is performed without using the UL grant (for example, a UL grant for retransmission is not provided when synchronous non-adaptive HARQ retransmission is performed through a PHICH indicating a NACK), the precoder is indicated by the most recent UL grant from among UL grants having the same HARQ process number as the indicated HARQ process number.

If UL retransmission is performed using the precoder indicated by the most recent UL grant having the same HARQ process number, and if ACK is received for a certain CW and NACK is received for the other CW, the CW corresponding to ACK can be set to a zero transport block, and retransmission of the CW corresponding to NACK using the precoder subset may be attempted.

Embodiment 2-C

In Embodiment 2-C, if ACK/NACK information is received through a PHICH for UL 2-CW transmission, the following precoder applicable to 1-CW retransmission can be used, and a detailed description thereof will hereinafter be given.

As described above, assuming that two TBs (or two CWs) are transmitted, if one TB (or CW) is successfully decoded and the other one TB (or CW) fails to be decoded, only the TB (or CW) that failed to be decoded can be retransmitted. It is determined whether decoding success/failure of the corresponding TB (or CW) can be confirmed through the ACK or NACK state for each TB (or CW). In the case of receiving the ACK state for a certain TB (or CW) through a PHICH, the UE does not transmit data of the corresponding TB (or CW). In the case of receiving the NACK state, the UE transmits data of the corresponding TB (or CW).

The following tables 11 and 12 illustrate examples of UL 2-CW transmission.

TABLE 11

|  | Time | | | |
|---|---|---|---|---|
|  | 0 | 1 | 2 | 3 |
| Inidication Type | UL Grant | PHICH (NACK\|NACK) | PHICH (NACK\|ACK) | PHICH (ACK) |
| Transmission Type | Initial or Re-Tx Initial or Re-Tx | Re-Transmission Re-Transmission | Re-Transmission No-Transmission | No-Transmission |
| TB transmission | TB_1 TB_2 | TB_1 TB_2 | TB_1 | |
| PMI Selection | PMI_(time 0) | PMI_(time 0) | PMI_(time 0) | |

TABLE 12

|  | Time | | |
|---|---|---|---|
|  | 0 | 1 | 2 |
| Inidication Type | UL Grant | PHICH (NACK\|ACK) | PHICH (ACK) |
| Transmission Type | Initial or Re Tx Initial or Re Tx | Re-Transmission | No-Transmission |
| TB transmission | TB_1 TB_2 | TB_1 | |
| PMI Selection | PMI_(time 0) | PMI_(time 0) | |

Table 11 shows that a UL grant PDCCH is received at a certain time (for example, a time 0) and initial transmission or retransmission (Re-Tx) of 2 TBs (or 2 CWs) is represented by UL grant indication. In this case, the precoder (i.e., PMI_(time 0) indicated by the UL grant can be utilized. If NACK information for 2 TBs (or 2 CWs) that was initially transmitted or retransmitted is received through a PHICH at a specific time (Time 1), both TBs (or CWs) can be retransmitted. At this time, the precoder to be used may indicate the precoder (i.e., PMI_(time 0)) indicated through the most recent uplink grant PDCCH (corresponding to a UL grant received at a time (Time 0)). In association with two retransmitted TBs (or CWs) (i.e., TB_1 and TB_2), if NACK for TB_1 is received through a PHICH and ACK for TB_2 is received through a PHICH at a time 2, TB_1 corresponding to NACK is retransmitted and TB_2 corresponding to ACK is not transmitted. At this time, the precoder to be used may indicate the precoder (i.e., PMI_(time 0)) indicated through the most recent uplink grant PDCCH (corresponding to a UL grant received at time 0). In association with one retransmitted TB (TB_1), ACK for TB_1 is received through a PHICH at time 3, retransmission is not performed any longer. If ACK for one retransmitted TB (TB_1) is received through a PHICH at time 3, retransmission is not performed any longer.

On the other hand, Table 12 shows that a UL grant PDCCH is received at a certain time (e.g., time 0) and two TBs (or two CWs) are initially transmitted or retransmitted (Re-Tx) according to UL grant indication. In this case, the precoder (i.e., PMI_(time 0)) indicated by UL grant can be utilized. In association with two TBs (or two CWs) that were initially transmitted or retransmitted, if NACK for TB_1 is received through a PHICH and ACK for TB_2 is received through a PHICH at a time 1, TB_1 corresponding to NACK is retransmitted and TB_2 corresponding to ACK is not transmitted. At this time, the precoder to be used may indicate the precoder (i.e., PMI_(time 0)) indicated through the most recent uplink grant PDCCH (corresponding to a UL grant received at time 0). In association with one retransmitted TB (TB_1), if ACK is received through a PHICH at time 2, retransmission is not performed any more.

If retransmission is performed as described above (all of 2 TBs may be retransmitted as shown in the above-mentioned example and only one TB may also be retransmitted as necessary), the same MCS as in the previous transmission may be applied to retransmission data (one or two TBs). In this case, one physical antenna may have a structure (for example, a structure of a Cubic Metric Preserving Codebook) for transmitting a signal of one layer according to the precoder structure defined for MIMO transmission. In this case, if one TB (or CW) from among two TBs (or two CWs) is not transmitted, no signal is transmitted through a physical antenna corresponding to a layer mapped to non-transmission CW.

Therefore, if another TB (or CW) is not transmitted during retransmission of a certain TB (or CW) (for example, if ACK for only one from among 2 TBs (or 2 Cs) is received), the MIMO scheme must be changed to transmit data through all physical antennas as compared to the previous transmission. That is, when retransmission of a TB (or CW) indicating NACK is performed by a PHICH, if the MIMO transmission scheme is fallen back using the antenna transmission scheme depending on the number of CW-mapped layers (i.e., a rank value), data can be transmitted through all physical antennas. Detailed examples of the embodiment 2-C that selects a precoding matrix according to the number of layers mapped to one retransmission TB (or CW) will hereinafter be described in detail.

Embodiment 2-C-1

In accordance with Embodiment 2-C-1, when retransmission of a TB (or CW) indicating NACK is performed by a PHICH, if one CW is mapped to one layer, a single antenna port transmission mode can be applied. A variety of techniques (for example, cyclic delay diversity (CDD), precoding vector switching (PVS), long-term beamforming, and closed-loop spatial multiplexing (SM)) in which a single layer is transmitted through a plurality of physical antennas can be applied to the single antenna port transmission mode.

Alternatively, if one CW is mapped to one layer, the precoder for single rank transmission can be utilized. The precoder for single rank transmission may be selected by the UE at random. Otherwise, the promised precoder between the UE and the BS may be used, and the promised precoder may be selected as a different precoder at every retransmission. In another example, the promised precoder may be used between the UE and the BS, and the promised precoder may also be selected as the same precoder at every retransmission. For example, a Rank-1 precoder (i.e., a precoder of v=1 shown in Table 6) defined for UL 2Tx antenna transmission of 3GPP LTE Release-10 may be used. Alternatively, a Rank-1 precoder (i.e., the precoder shown in Table 7) defined for UL 4Tx antenna transmission of 3GPP LTE Release-10 may be used.

For example, assuming that 2 TBs (or 2 CWs) are transmitted by a UL grant PDCCH, if ACK for TB__1 is received through a PHICH and NACK for TB__2 is received through a PHICH, it is assumed that TB__1 is not transmitted and TB__2 is retransmitted. In this case, UL data is retransmitted according to PHICH information and UL data retransmission can be performed through a single layer. That is, one codeword may be mapped to one layer. At this time, a precoding matrix to be used may be used as a precoding matrix for a rank (i.e., Rank-1) corresponding to the number (=1) of layers mapped to a TB (or CW) indicating NACK.

In other words, assuming that ACK/NACK information for the previously transmitted UL data is received through a PHICH, if the number (e.g., 2) of TBs indicated by the most recent PDCCH is different from the number (e.g., 1) of TBs indicated by NACK through a PHICH, the UE performs retransmission of a TB corresponding to NACK. In this case, UL transmission is performed using the same number of transmission layers as the number of layers (e.g., 1) mapped to a TB (or CW) corresponding to NACK, and the precoding matrix defined for the number (e.g., 1) of transmission layers may be used. For example, if the number of TBs corresponding to NACK is 1 and a codeword (CW) mapped to the corresponding TB is mapped to one layer, the Rank-1 precoder may be used during retransmission of a TB corresponding to NACK.

Embodiment 2-C-2

In accordance with Embodiment 2-C-2, assuming that retransmission of a TB (or CW) indicated by NACK through a PHICH is performed, if one CW is mapped to two layers, two-antenna-ports transmission mode may be used. A variety of techniques in which one layer is transmitted through a plurality of physical antennas and the other one layer is transmitted through other physical antennas can be applied to the 2-antenna-port transmission mode.

Alternatively, if one CW is mapped to two layers, the precoder for Rank-2 transmission can be utilized. The precoder for Rank-2 transmission may be selected by the UE at random. Otherwise, the promised precoder between the UE and the BS may be used, and the promised precoder may be selected as a different precoder at every retransmission. In another example, the promised precoder may be used between the UE and the BS, and the promised precoder may also be selected as the same precoder at every retransmission. For example, a Rank-2 precoder (i.e., a precoder of v=2 shown in Table 6) defined for UL 2Tx antenna transmission of 3GPP LTE Release-10 may be used. Alternatively, a Rank-2 precoder (i.e., the precoder shown in Table 8) defined for UL 4Tx antenna transmission of 3GPP LTE Release-10 may be used.

For example, assuming that 2 TBs (or 2 CWs) are transmitted by a UL grant PDCCH, if ACK for TB__1 is received through a PHICH and NACK for TB__2 is received through a PHICH, it is assumed that TB__1 is not transmitted and TB__2 is retransmitted. In this case, UL data is retransmitted according to PHICH information and UL data retransmission can be performed through two layers. That is, one codeword may be mapped to two layers. At this time, a precoding matrix may be used as a precoding matrix for a rank (i.e., Rank-2) corresponding to the number (=2) of layers mapped to a TB (or CW) indicating NACK.

In other words, assuming that ACK/NACK information for the previously transmitted UL data is received through a PHICH, if the number (e.g., 2) of TBs indicated by the most recent PDCCH is different from the number (e.g., 1) of TBs indicated by NACK through a PHICH, the UE performs retransmission of a TB corresponding to NACK. In this case, UL transmission is performed using the same number of transmission layers as the number of layers (e.g., 2) mapped to a TB (or CW) corresponding to NACK, and the precoding matrix defined for the number (e.g., 2) of transmission layers may be used. For example, if the number of TBs corresponding to NACK is 1 and a codeword (CW) mapped to the corresponding TB is mapped to two layers, the Rank-2 precoder may be used during retransmission of a TB corresponding to NACK.

Embodiment 2-D

Examples of the codeword-to-layer mapping relationship during retransmission will hereinafter be described with reference to Embodiment 2-D.

Codeword (CW) swapping will hereinafter be described in detail.

Two codewords are transmitted on uplink, and ACK and NACK, NACK and ACK, or NACK and NACK are received per CW, so that one or two CWs can be retransmitted. In this case, the layer mapped to CW may be greatly changed as compared to the previous transmission. That is, the layer mapped to CW may be changed whenever retransmission is performed.

For example, if NACK for only one of two CWs is received in previous transmission, the retransmitted (i.e., NACK) CW may be mapped to a layer in which an ACK CW was transmitted in the previous transmission. For example, after CW1 is transmitted through a first layer and CW2 is transmitted through a second layer, assuming that ACK for CW1 is received and NACK for CW2 is received, CW2 corresponding to NACK is retransmitted. In this case, CW2 is mapped to a first layer and then retransmitted.

In another example, if NACK for all CWs is received, all CWs are retransmitted. In this case, the position of a layer mapped to CW can be changed during retransmission. For example, after CW1 is mapped to the first layer and CW2 is mapped to the second layer and then transmitted, assuming that NACK is received for both CW1 and CW2, CW1 is mapped to the second layer and CW2 is mapped to the first layer, so that the resultant CW1 and CW2 can be retransmitted.

Application examples of null-transmission and CW swapping will hereinafter be described in detail.

For example, under the condition that a signal corresponding to a CW having received an ACK state is not transmitted (i.e., a null signal is transmitted) and a CW having received a NACK state is retransmitted, the retransmitted CW is mapped to a layer mapped to a CW that has received the ACK state in previous transmission, and then retransmitted. For example, after CW1 is transmitted through a first layer and CW2 is transmitted through a second layer, if ACK is received for CW1 and NACK is received for CW2, a null signal is transmitted in association with CW1 and a CW2 corresponding to NACK is retransmitted. In this case, CW2 is mapped to the first layer and then retransmitted.

In another example, when a signal corresponding to CW having received the ACK state is not transmitted (i.e., a null signal is transmitted) and only a CW having received the NACK state is retransmitted, the retransmitted CW can be transmitted through a layer different from the layer mapped in previous transmission. In this case, the position of a layer mapped to a CW may be changed at every retransmission.

In the above-mentioned examples, ACK/NACK information for UL transmission of two CWs can be obtained through multiple PHICH transmission (See Embodiment 1-B), or can be obtained through a single PHICH having multiple states (See Embodiment 1-A).

3. PHICH Resource Allocation for Retransmission

In order to indicate success or failure of TB (or CW) decoding when multiple TBs (or CWs) are transmitted, a plurality of PHICH resources can be allocated. A plurality of PHICH resources may be allocated so that ACK/NACK signals of multiple TBs (or CWs) may be indicated.

For example, if a maximum of two TBs (or two CWs) is transmitted on uplink, two PHICH resources can be established, and ACK/NACK information for each TB (or CW) may be transmitted through one PHICH resource. PHICH resources may be determined to be a combination of different indexes. For example, a PHICH resource may be established as a combination of the lowest PRB index and the cyclic shift (CS) index that are contained in a DCI format of the UL grant PDCCH. For example, a PHICH resource may be identified by a pair of indexes (hereinafter referred to as an index pair) ($n_{PHICH}^{group}$, $n_{PHICH}^{seq}$), wherein $n_{PHICH}^{group}$ is a PHICH group number, and $n_{PHICH}^{seq}$ is an orthogonal sequence index contained in the corresponding group. $n_{PHICH}^{group}$ and $n_{PHICH}^{seq}$ can be defined by the following equation 14.

$$n_{PHICH}^{group} = (I_{PRB\_RA} + n_{DMRS}) \bmod N_{PHICH}^{group} + I_{PHICH} N_{PHICH}^{group}$$

$$n_{PHICH}^{seq} = (\lfloor I_{PRB\_RA} / N_{PHICH}^{group} \rfloor + n_{DMRS}) \bmod 2N_{SF}^{PHICH}$$

[Equation 14]

In Equation 14, $n_{DMRS}$ is mapped to TB(s) associated with the corresponding PUSCH transmission on the basis of 'CS field for DMRS' (hereinafter referred to as 'DMRS CS field') contained in the most recent reception PDCCH from among UL grant DCI format PDCCHs (also called a UL DCI format). If the DMRS CS field of a PDCCH having a UL DCI format is set to '000', $n_{DMRS}$ may be mapped to zero (0). Assuming that the DMRS CS field is set to '001', '010', '011', '100', '101', '110' or '111', $n_{DMRS}$ may be mapped to 1, 2, 3, 4, 5, 6, or 7. On the other hand, assuming that a PDCCH having a UL DCI format for the same TB is not present, if an initial PUSCH for the same TB may be semi-persistently scheduled or an initial PUSCH is scheduled by a random access response grant, $n_{DMRS}$ may be set to zero.

In Equation 14, $N_{SF}^{PHICH}$ a spreading factor used for PHICH modulation.

In Equation 14, $I_{PRB\_RA}$ may have any one of $I_{PRB\_RA}^{lowest\_index}$ or $I_{PRB\_RA}^{lowest\_index}+1$. $I_{PRB\_RA}^{lowest\_index}$ is the lowest is the lowest PRB index of a first slot of the corresponding PUSCH transmission. An exemplary case in which $I_{PRB\_RA}$ is set to $I_{PRB\_RA}^{lowest\_index}$ or $I_{PRB\_RA}^{lowest\_index}+1$ will hereinafter be described with reference to embodiments of the present invention.

In Equation 14, $N_{PHICH}^{group}$ is the number of PHICH groups established by a higher layer, $I_{PHICH}$ is set to 1 in one case in which PUSCH transmission is denoted by n=4 or n=9 at TDD UL/DL setting '0', and $I_{PHICH}$ may be set to '0' in the remaining cases.

If transmission of a TB (or CW) indicated by ACK through a PHICH is not performed, and NDI is toggled at either a UL grant received simultaneously with a PHICH or a UL grant received after PHICH transmission (i.e., if new data indication is indicated), a flush operation for acquiring an empty transmission buffer (i.e., if new data transmission is indicated) can be carried out.

Meanwhile, TB (or CW) indicated by NACK through a PHICH can be retransmitted. In this case, if there is only one TB (or CW) to be retransmitted, information (i.e., ACK/NACK for retransmission) as to whether retransmission is successfully decoded by a receiver can be sufficiently represented using only one PHICH resource. That is, after allocation of multiple PHICH resources, if a certain TB (or CW) from among multiple TBs (or CWs) indicates ACK and another TB (or CW) indicates NACK, retransmission can be performed. In the case of retransmission, a PHICH suitable for the number of TBs (or CWs) participating in retransmission can be used.

For example, assuming that two PHICH resources are allocated for two TBs (or two CWs), if one of two TBs (or two CWs) indicates ACK and the other one TB (or CW) indicates NACK through two PHICH resources, retransmission of one TB (or CW) indicated by NACK is attempted. In case of retransmission, one PHICH resource is used for one TB (or CW) to be retransmitted, so that ACK or NACK for the corresponding TB (or CW) can be indicated.

Assuming that multiple PHICH resources are used for UL MCW transmission, if ACK for some TBs is received through the multiple PHICH resources and NACK for some other TBs is received through the multiple PHICH resources, retransmission of a TB corresponding to NACK is performed. PHICH resources indicating ACK/NACK for such retransmission may be selected as some resources from among multiple PHICH resources. Examples for selecting PHICH resources will hereinafter be described.

Embodiment 3-A

In accordance with Embodiment 3-A, PHICH resources allocated for a first TB (or CW) can be allocated as PHICH resources for retransmission.

For example, it may be assumed that UL transmission of two TBs through the UL grant PDCCH is scheduled. That is, a PDCCH may indicate initial transmission of two TBs. Therefore, the UE may transmit two TBs through a PUSCH. In association with two UL transmission TBs, ACK/NACK information may be received through multiple PHICH resources. For example, in order to indicate ACK/NACK information of the first TB, a first PHICH resource can be allocated. In order to indicate ACK/NACK information of the second TB, a second PHICH resource can be allocated. The first PHICH resource and the second PHICH resource may be distinguished from each other according to different indexes. For example, if the lowest PRB index (I) is allocated to the first PHICH resource, the lowest PRB index (I+1) may be allocated to the second PHICH resource.

If a PHICH indicates a NACK of one TB (i.e., first TB or second TB) from among two UL transmission TBs, retransmission of a TB corresponding to NACK can be performed. Such retransmission is performed through a PUSCH. In this case, the UL grant PDCCH that directly schedules the corresponding PUSCH transmission is not present, and retransmission can be performed using an MCS level contained in the most recent PDCCH (for example, a PDCCH that schedules initial transmission of 2 TBs). In association with retransmission of a TB corresponding to NACK, ACK/NACK information can be received through a PHICH. In this case, a PHICH resource for retransmission of a TB corresponding to NACK can be selected as a PHICH resource (i.e., a first PHICH resource) allocated for the first TB from among multiple PHICH resources.

In other words, provided that a PDCCH related to transmission of a certain PUSCH is not present (i.e., if retransmission is performed according to PHICH reception without using the UL grant PDCCH), if the number (for example, 1 in the aforementioned example) of TBs indicated by NACK is different from the number (for example, 2 in the aforementioned example) of TBs indicated by the most recent PDCCH (i.e., a PDCCH that schedules initial transmission of two TBs in the aforementioned example) related to the corresponding PUSCH (i.e., PUSCH that retransmits a TB indicating a NACK), a PHICH resource (i.e., a first PHICH resource) allocated for the first TB can be selected as a PHICH resource indicating ACK/NACK information related to retransmission of a TB indicating NACK. For example, assuming that any one of the first TB and the second TB indicates NACK during previous transmission, a PHICH resource allocated for retransmission of the NACK TB may be established as a PHICH resource (i.e., a first PHICH resource) for the first TB, irrespective of whether the NACK TB is the first TB or the second TB. For example, if $I_{PRB\_RA}$ shown in Equation 14 may be established as $I_{PRB\_RA}^{lowest\_index}$ in association with the first TB of a PUSCH, or if the number of NACK TBs is different from the number of TBs indicated by the most recent PDCCH related to the corresponding PUSCH so that no related PDCCH exists, $I_{PRB\_RA}$ may be set to $I_{PRB\_RA}^{lowest\_index}$. In addition, $I_{PRB\_RA}$ shown in Equation 14 may be established as $I_{PRB\_RA}^{lowest\_index}+1$ in association with the second TB of a PUSCH having a related PDCCH.

Embodiment 3-B

In accordance with Embodiment 3-B, the same PHICH resource as a PHICH resource that has been allocated for each TB (or CW) in previous transmission can be allocated to retransmission of each TB (or CW).

For example, during the previous transmission, ACK/NACK information can be transmitted through a first PHICH resource in association with the first TB (or CW), and ACK/NACK information can be transmitted through a second PHICH resource in association with the second TB (or CW). If ACK is received for the first TB (or CW) and NACK is received for the second TB (or CW), retransmission of the second TB (or CW) corresponding to NACK is performed, and the first TB (or CW) corresponding to ACK may not be transmitted. In this case, ACK/NACK information for the second TB (or CW) to be retransmitted can be transmitted through the same PHICH resource as in the previous transmission.

Embodiment 3-C

In accordance with Embodiment 3-C, from among PHICH resources allocated to each TB (or CW) during previous transmission, a PHICH resource allocated for each TB (or CW) having either a high MCS or the same MCS can be allocated for TB (or CW) retransmission.

For example, during the previous transmission, ACK/NACK information can be transmitted through a first PHICH resource in association with the first TB (or CW), and ACK/NACK information can be transmitted through a second PHICH resource in association with the second TB (or CW). In this case, it is assumed that the first TB has an MCS higher than that of the second TB. If ACK is received for the first TB (or CW) and NACK is received for the second TB (or CW), retransmission of the second TB (or CW) corresponding to NACK is performed, and the first TB (or CW) corresponding to ACK may not be transmitted. In this case, ACK/NACK information for the second TB (or CW) to be retransmitted can be transmitted through a PHICH resource (i.e., the first PHICH resource) allocated for the first TB having a high MCS. Alternatively, a PHICH resource allocated for a TB having the same MCS as an MCS level of a retransmission TB from among TBs of the previous transmission can be allocated to the retransmission TB.

Embodiment 3-D

In accordance with Embodiment 3-D, from among PHICH resources allocated to each TB (or CW) in previous transmission, a PHICH resource allocated for a TB (or CW) having a low MCS or the same MCS can be allocated for TB (or CW) retransmission.

For example, during the previous transmission, ACK/NACK information can be transmitted through a first PHICH resource in association with the first TB (or CW), and ACK/NACK information can be transmitted through a second PHICH resource in association with the second TB (or CW). In this case, it is assumed that the first TB has an MCS lower than that of the second TB. If ACK is received for the first TB (or CW) and NACK is received for the second TB (or CW), retransmission of the second TB (or CW) corresponding to NACK is performed, and the first TB (or CW) corresponding to ACK may not be transmitted. In this case, ACK/NACK information for the second TB (or CW) to be retransmitted can be transmitted through a PHICH resource (i.e., the first PHICH resource) allocated for the first TB having a low MCS. Alternatively, a PHICH resource allocated for a TB having the same MCS as an MCS level of a retransmission TB from among TBs of the previous transmission can be allocated to the retransmission TB.

4. RS Resource Allocation

For UL transmission, a demodulation reference signal (DMRS) can be transmitted. DMRS is a reference signal that is adapted to perform UL channel estimation for each antenna port or for each layer.

A cyclic shift (CS) value may be adapted to generate a DMRS sequence. A CS index applied to UL DMRS may be indicated through the 'Cyclic shift for DMRS' field of a PDCCH DCI format. In case of multi-layer channel estimation, UL DMRSs can be isolated from each other using the CS so that the UL DMRSs can be multiplexed. That is, each DMRS can be applied to each UL layer, and different DMRSs can be distinguished from each other on the basis of different CS indexes. That is, the CS may be considered to be an orthogonal resource for discriminating a DMRS. In addition, as the distance between CS resources applied to a DMRS for each layer is increased, performance of discriminating each layer by the receiver may be increased.

For example, a PUSCH DMRS sequence $r_{PUSCH}^{(\lambda)}(\bullet)$ for a layer $\lambda \gamma \{0, 1, \ldots, v-1\}$ may be defined as $r_{PUSCH}^{(\lambda)}(m \cdot M_{sc}^{RS}+n)=w^{(\lambda)}(m)r_{u,v}^{(\alpha_\lambda)}(n)$ where, m=0, 1, n=0, . . . , $M_{sc}^{RS}-1$ and $M_{sc}^{RS}=M_{sc}^{PUSCH}$. For example, an orthogonal sequence $w^{(\lambda)}(m)$ may be given as $[w^{\lambda}(0)\ w^{\lambda}(1)]=[1\ 1]$, or may be defined using the cyclic shift (CS) field (i.e., a cyclic shift index field for DMRS) indicated by a DCI format related to the most recent uplink for a TB related to the corresponding PUSCH transmission. For example, assuming that the CS field of a DCI format is set to '000', $[w^{(\lambda)}(0)\ w^{(\lambda)}(1)]$ may be set to [1 1], [1 1], [1−1] and [1−1] in association with $\lambda$=0, $\lambda$=1, $\lambda$=2 and $\lambda$=$\lambda$=3, respectively. In addition, if the CS field of a DCI format is set to '001', $[w^{(\lambda)}(0)\ w^{(\lambda)}(1)]$ may be set to [1−1], [1−1], [1 1] and [1 1] in association with $\lambda$=0, $\lambda$=1, $\lambda$=2 and $\lambda$=3, respectively. If the CS field of a DCI format is set to '010', $[w^{(\lambda)}(0)\ w^{(\lambda)}(1)]$ may be set to [1−1], [1−1], [1 1] and [1 1] in association with $\lambda$=0, $\lambda$=1, $\lambda$=2 and $\lambda$=3, respectively. If the CS field of a DCI format is set to '011', $[w^{(\lambda)}(0)\ w^{(\lambda)}(1)]$ may be set to [1 1], [1 1], [1 1] and [1 1] in association with $\lambda=0, \lambda=1, \lambda=2$ and $\lambda=3$, respectively. If the CS field of a DCI format is set to '100', $[w^{(\lambda)}(0)\ w^{(\lambda)}(1)]$ may be set to [1 1], [1 1], [1 1] and [1 1] in association with $\lambda=0, \lambda=1, \lambda=2$ and $\lambda=3$, respectively. If the CS field of a DCI format is set to '101', $[w^{(\lambda)}(0)\ w^{(\lambda)}(1)]$ may be set to [1 –1], [1 –1], [1 –1] and [1 –1] in association with $\lambda=0, \lambda=1, \lambda=2$ and $\lambda=3$, respectively. If the CS field of a DCI format is set to '110', $[w^{(\lambda)}(0)\ w^{(\lambda)}(1)]$ may be set to [1 –1], [1 –1], [1 –1] and [1 –1] in association with $\lambda=0, \lambda=1, \lambda=2$ and $\lambda=3$, respectively. If the CS field of a DCI format is set to '111', $[w^{(\lambda)}(0)\ w^{(\lambda)}(1)]$ may be set to [1 1], [1 1], [1 –1] and [1 –1] in association with $\lambda=0, \lambda=1, \lambda=2$ and $\lambda=3$, respectively.

In addition, in case of $r_{PUSCH}^{(\lambda)}(m \cdot M_{sc}^{RS}+n)=w^{(\lambda)}(m)r_{u,v}^{(\alpha,\lambda)}(n)$, a cyclic shift (CS) of a slot $n_s$ is given as $\alpha_\lambda = 2\pi n_{cs,\lambda}/12$, and is defined as $n_{cs,\lambda}=(n_{DMRS}^{(1)}+n_{DMRS,\lambda}^{(2)}+n_{PN}(n_s))\mod 12$. In this case, $n_{DMRS}^{(1)}$ may be set to 0, 2, 3, 4, 6, 8, 9 or 10 when a parameter (cyclicShift) provided by a higher layer is set to 0, 1, 2, 3, 4, 5, 6 or 7. In addition, $n_{DMRS,\lambda}^{(2)}$ is determined by the 'cyclic shift for DMRS' field indicated by the most recent uplink DCI format of a transport block (TB) related to the corresponding PUSCH transmission.

For example, assuming that the CS field of a DCI format is set to '000', $n_{DMRS,\lambda}^{(2)}$ may be set to 0, 6, 3 and 9 in association with $\lambda=0, \lambda=1, \lambda=2$ and $\lambda=3$, respectively. In addition, if the CS field of a DCI format is set to '001', $n_{DMRS,\lambda}^{(2)}$ may be set to 6, 0, 9 and 3 in association with $\lambda=0, \lambda=1, \lambda=2$ and $\lambda=3$, respectively. If the CS field of a DCI format is set to '010', $n_{DMRS,\lambda}^{(2)}$ may be set to 3, 9, 6 and 0 in association with $\lambda=0, \lambda=1, \lambda=2$ and $\lambda=3$, respectively. If the CS field of a DCI format is set to '011', $n_{DMRS,\lambda}^{(2)}$ may be set to 4, 10, 7 and 1 in association with $\lambda=0, \lambda=1, \lambda=2$ and $\lambda=3$, respectively. If the CS field of a DCI format is set to '100', $n_{DMRS,\lambda}^{(2)}$ may be set to 2, 8, 5 and 11 in association with $\lambda=0, \lambda=1, \lambda=2$ and $\lambda=3$, respectively. If the CS field of a DCI format is set to '101', $n_{DMRS,\lambda}^{(2)}$ may be set to 8, 2, 11 and 5 in association with $\lambda=0, \lambda=1, \lambda=2$ and $\lambda=3$, respectively. If the CS field of a DCI format is set to '110', $n_{DMRS,\lambda}^{(2)}$ may be set to 10, 4, and 7 in association with $\lambda=, \lambda=1, \lambda=2$ and $\lambda=3$, respectively. If the CS field of a DCI format is set to '111', $n_{DMRS,\lambda}^{(2)}$ may be set to 9, 3, 0 and 6 in association with $\lambda=0, \lambda=1, \lambda=2$ and $\lambda=3$, respectively.

When transmitting a DMRS on uplink, a signal generated in a time domain for use in the uplink data part is converted into a frequency-domain signal through DFT processing, and is mapped to subcarriers. Thereafter, IFFT processing and CP attachment of the subcarrier mapping result are conducted and transmitted (See FIG. 7), DFT processing of a DMRS is omitted, the DMRS is directly generated in a frequency domain and is mapped to subcarriers, and IFFT processing and CP attachment of the subcarrier mapping result are conducted and transmitted. In addition, the position of an OFDM symbol mapped to a DMRS in a UL subframe is as follows. In case of a normal CP, a DMRS is located at a fourth OFDM symbol of each of the two slots within one subframe. In case of an extended CP, a DMRS is located at a third OFDM symbol of each of the two slots within one subframe.

As described above, when transmitting two TBs (or two CWs), a sequence calculated on the basis of a CS index indicated by a DCI format of the most recent reception PDCCH can be applied to a DMRS. If decoding of one of two TBs (or two CWs) is successfully performed and decoding of the other one TB (or CW) fails, retransmission of one TB (or CW) having failed to be decoded can be performed. In this case, for retransmission of one TB (or CW) having failed decoding, there is a need to define which CS index is to be used. If a CS index to be used for the transmitter and the receiver is not determined, it may be impossible to perform channel estimation of a layer.

Therefore, when the UE performs the HARQ operation using information indicated by a PHICH under the condition that a PDCCH providing scheduling information of UL transmission is not detected, retransmission of some TBs (or CWs) can be performed. In this case, it may be necessary to determine whether a CS allocated to UL multiple layers is to be allocated as in the previous transmission, or it may be necessary to determine whether a new CS is to be allocated so as to increase the distance of CS resources. CS resource allocation according to embodiments of the present invention will hereinafter be described.

Embodiment 4-A

Considering the CW-to-layer mapping relationship shown in Tables 4 and 5, one certain CW can be mapped to a specific layer (one or more layers). When a certain TB (or CW) is retransmitted, a CS index allocated for a layer mapped to the retransmitted CW can be used for the corresponding retransmission.

For example, it is assumed that CW1 is mapped to a first layer and CW2 is mapped to second and third layers, so that the mapped results can be transmitted. If ACK is received in association with CW1 and NACK is received in association with CW2, CW2 corresponding to NACK can be retransmitted. In this case, the layer mapped to the retransmitted CW2 can be newly determined according to the CW-to-layer mapping rule. For example, the retransmitted CW2 can be mapped to the first and second layers. In this case, using the CS index allocated for the layers (i.e., the first and second layers) mapped to the retransmitted CW2, a sequence for a DMRS of a layer used for retransmisison can be generated.

In other words, the layer mapped to the retransmitted CW can be reset according to the CW-to-layer mapping rule during retransmission of a CW indicating a NACK. In accordance with Embodiment 4-A, the CS index for DMRS for use in retransmission may be represented by a CS index for a layer that is newly mapped (reset) to the retransmitted CW. For example, the CS value $n_{DMRS,\lambda}^{(2)}$ for a DMRS can be determined according to not only 'CS index for DMRS' indicated by the UL grant PDCCH but also the number (i.e., rank) of layers of a transmission signal. The operation for resetting the layer mapped to the retransmitted CW according to the codeword-to-layer mapping rule during retransmission of a CW corresponding to NACK may also indicate that the DMRS CS value $n_{DMRS,\lambda}^{(2)}$ is (newly) re-determined according to not only the 'CS index for DMRS' field indicated by the most recent UL grant DCI format PDCCH but also the number of layers attempting retransmission.

Embodiment 4-B

If some TBs (or CWs) are retransmitted for UL MCW transmission, a precoder subset (or some columns) indicated by the most recent UL grant PDCCH can be selected (See Embodiment 2). In this case, the precoder can also be used for mapping the layer to antenna ports. Therefore, if some columns of the precoder are selected in retransmission, this means that some layers from among layers mapped to the precoder are selected. Accordingly, as a CS index for a DMRS used for retransmission, a CS index allocated for the layer selected by the precoder can be utilized.

For example, it is assumed that CW1 is mapped to a first layer and CW2 is mapped to second and third layers so that the mapped results can be transmitted. If ACK is received in association with CW1 and NACK is received in association with CW2, CW2 corresponding to NACK can be retransmitted. For example, during CW2 retransmission, second and third columns of the precoder can be selected as the precoder subsets of FIG. 9(b). That is, the second and third columns of the precoder can be selected for CW2 retransmission, so that the second and third layers can be selected. Accordingly, using the CS index allocated for the layers (i.e., the second and third layers) corresponding to the precoder columns used for retransmission, a sequence for a DMRS of a layer used for retransmisison can be generated.

In other words, the precoder subset selected by retransmission of a NACK CW may indicate the layer mapped to the retransmitted CW in previous transmission. In accordance with Embodiment 4-B, the CS index for DMRS for use in retransmission may be represented by reuse of a CS index that was used for the layer mapped to the corresponding CW in previous transmission. For example, the CS value $n_{DMRS,\lambda}^{(2)}$ for a DMRS can be determined according to not only 'CS index for DMRS' indicated by the UL grant PDCCH but also the number (i.e., rank) of layers of a transmission signal. In association with the CS index for DMRS during retransmission of NACK CW, reuse of the CS index that was used for the layer mapped to the corresponding CW in previous transmission may also indicate that the CS value $n_{DMRS,\lambda}^{(2)}$ of a DMRS having been allocated for TB1 or TB2 in the previous transmission is used for the layer corresponding to a TB attempting retransmission. Here, in case of TB1 retransmission, the TB attempting retransmission is identical to a TB1 of the previous transmission, and in case of TB2 retransmission, the TB attempting retransmission is identical to a TB2 of the previous transmission.

5. HARQ Operations Based on PHICH and PDCCH

As described above, the UL HARQ operation of a UE can be defined in different ways according to one case in which the UE does not detect the UL grant PDCCH and uses information indicated through a PHICH, and the other case in which the UE performs PHICH transmission and detects a UL grant PDCCH.

In accordance with Embodiment 4-B, when the HARQ operation is performed on the condition that the UE detects a PDCCH, a method for retransmitting multiple TBs (or CWs) in UL MIMO transmission will hereinafter be described in detail.

Embodiment 5-A

In accordance with Embodiment 5-A, in association with UL MCW transmission, ACK/NACK information received through a PHICH is combined with control information received through a PDCCH so that it can be determined whether the UE will perform retransmission or new data transmission.

It is assumed that a PHICH can indicate ACK/NACK states for each TB (or CW). That is, multiple PHICHs can be provided to multiple TBs (or CWs), or one PHICH can provide an ACK/NACK state for each TB (or CW) through multiple states (See Embodiments 1-A and 1-B).

Control information provided through a PDCCH may include a new data indicator (NDI). In this case, in association with transmission of 2 TBs (or 2 CWs), an ACK/NACK state indicated by a PHICH is combined with an NDI state through a PDCCH, so that the UE operation can be determined according to the combination result. Alternatively, another field instead of an NDI of a PDCCH, may also be used as necessary.

The UE may receive a PHICH at a predetermined time (for example, after lapse of four subframes) upon completion of UL 2CW transmission, may receive a PDCCH while simultaneously receiving a PHICH, or may receive a PDCCH at a specific time after PHICH reception.

In this case, the UE operation can be represented by the following equation 13.

TABLE 13

| | PHICH ACK/NACK state | PDCCH seen by the UE | UE Behavior |
|---|---|---|---|
| 1$^{st}$ CW | ACK or NACK | New transmission | New transmission according to PDCCH |
| | ACK or NACK | Retransmission | Retransmission according to PDCCH (adaptive retransmission) |
| 2$^{nd}$ CW | ACK or NACK | New transmission | New transmission according to PDCCH |
| | ACK or NACK | Retransmission | Retransmission according to PDCCH (adaptive retransmission) |

If the UE can view PDCCH control information, the HARQ operation to be performed by the UE can be designated by PDCCH indication. If a PDCCH indicates new data transmission of a certain TB (or CW) (for example, if an NDI value is toggled), the UE may empty the HARQ buffer and may attempt new data transmission. In other words, if retransmission or new transmission of each TB (or CW) is indicated through a PDCCH, the HARQ operation can be performed according to PDCCH indication without considering ACK/NACK states for each TB (or CW) indicated by a PHICH.

Hereinafter, an exemplary case in which only one of two TBs (or two CWs) is transmitted and the other one TB (or CW) is not transmitted (or if a null signal is transmitted) according to the embodiments of the present invention will be described in detail.

By combining an ACK/NACK state of each TB (or CW) indicated by a PHICH with a predetermined indicator (for example, NDI) indicating retransmission or new transmission of each TB (or CW), it is possible to inform the UE of which TB (or CW) is not transmitted.

For example, a TB (or CW) indicating ACK through a PHICH may indicate that retransmission is not performed. In this case, if an indicator (e.g., NDI) contained in a PDCCH does not indicate new transmission of the corresponding TB (or CW) (for example, if NDI is not toggled), the corresponding TB (or CW) is not transmitted. That is, the corresponding TB (or CW) is disabled. Alternatively, if an indicator (e.g., NDI) contained in a PDCCH indicates new transmission of the corresponding TB (or CW) (for example, if NDI is toggled), new data transmission of the corresponding TB (or CW) is performed.

In the meantime, a TB (or CW) indicated by NACK through a PHICH indicates execution of retransmission. In this case, if an indicator (e.g., NDI) contained in a PDCCH does not indicate new transmission of the corresponding TB (or CW) (that is, if NDI is not toggled), retransmission of the corresponding TB (or CW) can be performed.

In association with a TB (or CW) indicated by NACK through a PHICH, if an indicator (e.g., NDI) contained in a PDCCH indicates new transmission (e.g., if NDI is toggled), there occurs ambiguity as to whether retransmission or new data transmission is performed. Under this situation, no transmission of the corresponding TB (or CW) may be established (that is, the corresponding TB (or CW) is disabled). Alternatively, new data may be transmitted at the corresponding TB (or CW) on the basis of a PDCCH indicator.

In brief, the UE operation determined by a combination of PHICH information of one TB (or CW) with PDCCH information can be represented by the following tables 14 and 15.

TABLE 14

| PHICH ACK/NACK state | | PDCCH indicator state | UE Behavior |
|---|---|---|---|
| $1^{st}$ CW (or $2^{nd}$ CW) | ACK | New-Transmission X | No transmission |
| | ACK | New-Transmission O | New data transmission |
| | NACK | New-Transmission X | Re-transmission |
| | NACK | New-Transmission O | No transmission |

TABLE 15

| PHICH ACK/NACK state | | PDCCH indicator state | UE Behavior |
|---|---|---|---|
| $1^{st}$ CW (or $2^{nd}$ CW) | ACK | New-Transmission X | No transmission |
| | ACK | New-Transmission O | New data transmission |
| | NACK | New-Transmission X | Re-transmission |
| | NACK | New-Transmission O | New data transmission |

Embodiment 5-B

In accordance with Embodiment 5-B, in association with UL MCW transmission, ACK/NACK information through a single PHICH is combined with control information through a PDCCH so that it can be determined whether the UE will perform retransmission or new data transmission.

In this case, it is assumed that only one of an ACK state and a NACK state for multiple TBs (or CWs) is indicated through a single PHICH (See Embodiment 1-C). For example, an ACK/NACK signal for multiple TBs (or CWs) can be represented by 1 bit on a single PHICH. If two TBs (or two CWs) are successfully decoded, ACK can be indicated. If at least one of two TBs (or two CWs) fails to decode, NACK can be indicated.

If a single PHICH is transmitted as described above, the UE operation depending upon an ACK/NACK state indicated by a PHICH can be represented by the following table 16.

TABLE 16

| $1^{st}$ and $2^{nd}$ CW | Behavior |
|---|---|
| ACK | $1^{st}$ CW: Non-(Re)transmission (PDCCH is required to resume retransmission) $2^{nd}$ CW: Non-(Re)transmission (PDCCH is required to resume retransmission) |
| NACK | $1^{st}$ CW: Retransmission (Non-adaptive) $2^{nd}$ CW: Retransmission (Non-adaptive) |

With reference to Table 16, in association with two TBs (or two CWs), if a PHICH indicates the ACK state, two TBs (or two CWs) are not transmitted at all, and UL scheduling caused by a PDCCH is required for retransmission. In the meantime, in association with two TBs (or two CWs), if a PHICH indicates a NACK state, non-adaptive retransmission of all the TBs (or CWs) can be performed.

If control information provided through a PDCCH may include an NDI, the UE operation for transmission of 2 TBs (or 2 CWs) can be determined by combining an ACK/NACK state indicated by a PHICH with an NDI state obtained through a PDCCH. Alternatively, another field instead of an NDI of a PDCCH may be used as necessary.

The UE may receive a PHICH at a predetermined time (for example, after lapse of four subframes) upon completion of UL 2CW transmission, may receive a PDCCH while simultaneously receiving a PHICH, or may receive a PDCCH at a specific time after PHICH reception. In this case, one PHICH may indicate an ACK or NACK state of two TBs (or two CWs), and an indicator for each TB (or CW) may be contained in a PDCCH. In this case, the UE operation can be represented by the following table 17.

TABLE 17

| PHICH ACK/NACK state | | PDCCH seen by the UE | UE Behavior |
|---|---|---|---|
| $1^{st}$ CW and $2^{nd}$ CW | ACK | New transmission | New transmission according to PDCCH |
| | ACK | Retransmission | Retransmission according to PDCCH (adaptive retransmission) |
| | NACK | New transmission | New transmission according to PDCCH |
| | NACK | Retransmission | Retransmission according to PDCCH (adaptive retransmission) |

If the UE can view PDCCH control information, the HARQ operation to be performed by the UE can be designated by PDCCH indication. If a PDCCH indicates new data transmission of a certain TB (or CW) (for example, if an NDI value is toggled), the UE may empty the HARQ buffer and may attempt new data transmission. In other words, if retransmission or new transmission of each TB (or CW) is indicated through a PDCCH, the HARQ operation can be performed according to PDCCH indication without considering ACK/NACK states for two TBs (or two CWs) indicated by a single PHICH.

Hereinafter, an exemplary case in which an ACK or NACK state for two TBs (or two CWs) is indicated through a single PHICH under the condition that the UE detects a PDCCH according to the present invention will be described in detail.

Retransmission or new data transmission of the UE for each TB (or CW) can be determined by combining a single PHICH ACK/NACK state with a predetermined indicator (for example, NDI) indicating retransmission or new data transmission for each TB (or CW) contained in a PDCCH. Detailed examples will hereinafter be described with reference to the following tables 18 and 19.

TABLE 18

| PHICH ACK/NACK state | Indicator for 1st CW | Indicator for 2nd CW | Behavior |
|---|---|---|---|
| ACK | New transmission | New transmission | New data transmission |
| ACK | New transmission | Retransmission | 1st CW: New data transmission 2nd CW: Retransmission |
| ACK | Retransmission | New transmission | 1st CW: Retransmission 2nd CW: New data transmission |
| NACK | Retransmission | Retransmission | Retransmission |

For example, an indicator shown in Table 18 may be an NDI contained in a UL grant PDCCH. As can be seen from Table 18, if an ACK state is received through a single PHICH and new transmission is indicated through a PDCCH indicator, it is possible to attempt new transmission of each TB (or CW). Alternatively, if an ACK or NACK state is received through a single PHICH and retransmission is indicated through a PDCCH indicator, it is possible to attempt retransmission of each TB (or CW). In this case, if an indicator indicating new transmission or retransmission of two TBs (or two CWs) exists, new transmission or retransmission for each TB (or CW) can be independently performed. That is, new transmission or retransmission for one TB (or CW) can be performed irrespective of new transmission or retransmission of a different TB (or CW).

TABLE 19

| PHICH ACK/NACK state | Indicator for 1st CW | Indicator for 2nd CW | Behavior |
|---|---|---|---|
| ACK | New transmission | New transmission | New data transmission |
| NACK | New transmission | Retransmission | 1st CW: New data transmission<br>2nd CW: Retransmission |
| NACK | Retransmission | New transmission | 1st CW: Retransmission<br>2nd CW: New data transmission |
| NACK | Retransmission | Retransmission | Retransmission |

For example, an indicator shown in Table 19 may be an NDI contained in a UL grant PDCCH. As can be seen from Table 19, if an ACK state is received through a single PHICH and new transmission is indicated through a PDCCH indicator, it is possible to attempt new transmission of each TB (or CW). Alternatively, if an ACK or NACK state is received through a single PHICH and retransmission is indicated through a PDCCH indicator, it is possible to attempt retransmission of each TB (or CW). In this case, if an indicator indicating new transmission or retransmission of two TBs (or two CWs) exists, new transmission or retransmission for each TB (or CW) can be independently performed. That is, new transmission or retransmission for one TB (or CW) can be performed irrespective of new transmission or retransmission of a different TB (or CW).

Embodiment 5-C

In accordance with Embodiment 5-C, if a single PHICH for UL MCW transmission is transmitted (for example, if two TBs (or two CWs) are successfully decoded, ACK is transmitted, and if decoding of at least one of two TBs (or two CWs) fails, NACK is transmitted), the retransmission operation for ACK/NACK states indicated by a PHICH can be defined as shown in Table 16. In this case, the order of layers mapped to two TBs (or two CWs) may be exchanged or swapped. For example, the CW-to-layer mapping swap can be defined as shown in Table 20.

TABLE 20

|  | First codeword | Second codeword |
|---|---|---|
| First transmission | First layer | Second layer |
| Second transmission | Second layer | First layer |
| Third transmission | First layer | Second layer |
| Fourth transmission | Second layer | First layer |

If the layers to which the codewords are mapped are swapped upon retransmission, a codeword decoding success rate can be increased. For example, if a first codeword is transmitted via a first layer and a second codeword is transmitted via a second layer upon first transmission, the channel state of the first layer may be better than that of the second layer and thus the first codeword may be successfully decoded, but decoding of the second codeword may fail. In this case, if codeword-to-layer mapping is not swapped upon retransmission, the second codeword is retransmitted via the second layer having a worse channel state and thus decoding of the second codeword may fail. In contrast, if codeword-to-layer mapping is swapped upon retransmission, the second codeword is transmitted via the first layer having a better channel state and a decoding success rate of the second codeword can be increased.

6. DCI Configuration for HARQ Operation in UL MCW Transmission

In a conventional 3GPP LTE system, a single codeword is transmitted in uplink transmission and uplink scheduling information thereof may be given via a PDCCH having DCI format 0. The existing DCI format 0 may be defined as shown in Table 21.

TABLE 21

| Contents | Number of bits |
|---|---|
| Flag for format 0/format 1A differentiation | 1 bit |
| Hopping flag | 1 bit |
| Resource block assignment and hopping resource allocation | N bits |
| Modulation and coding scheme and redundancy version | 5 bits |
| New data indicator | 1 bit |
| TPC command for scheduled PUSCH | 2 bits |
| Cyclic shift for DMRS | 3 bits |
| UL index (for TDD) | 2 bits |
| Downlink Assignment Index (for TDD) | 2 bits |
| CQI request | 1 bit |

In DCI format 0, a "Flag for format 0/format 1A differentiation" field is a field for differentiating between DCI format 0 and DCI format 1A. Since DCI format 1A is a DCI format for scheduling downlink transmission and has the same payload size as DCI format 0, a field for differentiating between DCI format 0 and DCI format 1A is included while DCI format 0 and DCI format 1A have the same format. The "Flag for format 0/format 1A differentiation" field having a value of 0 indicates DCI format 0 and the "Flag for format 0/format 1A differentiation" field having a value of 1 indicates DCI format 1A.

A "Hopping flag" (frequency hopping flag) field indicates whether PUSCH frequency hopping is applied. The "Hopping flag" field having a value of 0 indicates that PUSCH frequency hopping is not applied and the "Hopping flag" field having a value of 1 indicates that PUSCH frequency hopping is applied.

A "Resource block assignment and hopping resource allocation" field indicates resource block assignment information of an uplink subframe depending on whether PUSCH frequency hopping is applied.

A "Modulation and coding scheme and redundancy version" field indicates modulation order and a redundancy version (RV) of a PUSCH. The RV indicates information about which subpacket is retransmitted in case of retransmission. Among 32 states represented by 5 bits, 0 to 28 may be used to indicate modulation order and 29 to 31 may be used to indicate RV indexes 1, 2 and 3.

A "New data indicator" field indicates whether uplink scheduling information is for new data or retransmitted data. If the value of this field is toggled from an NDI value of previous transmission, this indicates that new data is transmitted and, if the value of this field is not toggled from an NDI value of previous transmission, this indicates that data is retransmitted.

A "TPC command for scheduled PUSCH" field indicates a value for deciding transmit power of PUSCH transmission.

A "Cyclic shift for DMRS" field is a cyclic shift value used to generate a sequence for a demodulation reference signal (DMRS). The DMRS is a reference signal used to estimate an uplink channel per antenna port or layer.

A "UL index (for TDD)" field may indicate a subframe index set to uplink transmission in a specific uplink-downlink configuration if a radio frame is configured using a time division duplexing (TDD) scheme.

A "Downlink Assignment Index (for TDD)" field may indicate a total number of subframes set to PDSCH transmission in a specific uplink-downlink configuration if a radio frame is configured using a TDD scheme.

A "channel quality indicator (CQI) request" field indicates a request for reporting aperiodic channel quality information (CQI), a precoding matrix indicator (PMI) and a rank indicator (RI) using a PUSCH. If the "CQI request" field is set to 1, a UE transmits a report for aperiodic CQI, PMI and RI using a PUSCH.

Meanwhile, a PDCCH of DCI format 2 for scheduling transmission of multiple downlink codewords may include control information shown in Table 22.

TABLE 22

| Contents | | Number of bits |
|---|---|---|
| Resource allocation header (resource allocation type0/type 1) | | 1 bit |
| Resource block assignment and hopping resource allocation | | N bits |
| TPC command for PUCCH | | 2 bits |
| Downlink Assignment Index (for TDD) | | 2 bits |
| HARQ process number | | 3 bits (FDD), 4 bits (TDD) |
| Transport block to codeword swap flag | | 1 bit |
| For 1$^{st}$ codeword | Modulation and coding scheme | 5 bits |
| | New data indicator | 1 bit |
| | Redundancy version | 2 bits |
| For 2$^{nd}$ codeword | Modulation and coding scheme | 5 bits |
| | New data indicator | 1 bit |
| | Redundancy version | 2 bits |
| Precoding information | | 3 bits (2 transmit antennas at eNode-B) 6 bits (4 transmit antennas at eNode-B) |

In DCI format 2, a "Resource allocation header (resource allocation type 0/type 1)" field having a value of 0 indicates resource allocation of Type 0 and a "Resource allocation header (resource allocation type 0/type 1)" field having a value of 1 indicates resource allocation of Type 1. Resource allocation of Type 0 may indicate that resource block groups (RBGs) allocated to a scheduled UE are a set of contiguous physical resource blocks (PRBs). Resource allocation of Type 1 may indicate physical resource blocks allocated to a scheduled UE in a set of physical resource blocks of one RBG selected from a subset of a predetermined number of RBGs.

A "Resource block assignment" field indicates a resource block allocated to a scheduled UE according to resource assignment of Type 0 or Type 1.

A "TPC command for PUCCH" field indicates a value for deciding transmit power of PUCCH transmission.

A "Downlink Assignment Index (for TDD)" field may indicate a total number of subframes set to PDSCH transmission in a specific uplink-downlink configuration if a radio frame is configured using a TDD scheme.

A "HARQ process number" field may indicate which of a plurality of HARQ processes managed by a HARQ entity is used for transmission.

A "Transport block to codeword swap flag" field indicates a transport block-to-codeword mapping relationship if two transport blocks are enabled. If the "Transport block to codeword swap flag" field has a value of 0, this indicates that a transport block 1 is mapped to a codeword 0 and a transport block 2 is mapped to a codeword 1, and, if the "Transport block to codeword swap flag" field has a value of 1, this indicates that a transport block 2 is mapped to a codeword 0 and a transport block 1 is mapped to a codeword 1.

In DCI format 2, a "Modulation and coding scheme" field, a "New data indicator" field and a "redundancy version" field are defined with respect to a first codeword and a second codeword. The "Modulation and coding scheme" field indicates a modulation order of a PUSCH. The "New data indicator" field indicates whether downlink scheduling information is new data or retransmitted data. The "Redundancy version" field indicates information about which subpacket is retransmitted in case of retransmission.

A "precoding information" field may indicate a codebook index for precoding of downlink transmission. If a BS includes two transmit antennas, 3 bits are necessary to indicate codebook indexes of Rank 1 and Rank 2 and six bits are necessary to indicate codebook indexes of Ranks 1, 2, 3 and 4.

As described above with reference to Tables 21 and 22, in the existing 3GPP LTE system, DCI format 0 for transmission of a single uplink codeword and DCI format 2 for transmission of multiple downlink codewords are defined and a PDCCH DCI format for transmission of multiple uplink codewords is not defined.

In the present invention, examples of a new DCI format for transmission of multiple uplink codewords (uplink grant via a PDCCH) are proposed as shown in Tables 23, 24 and 25.

TABLE 23

| Contents | Number of bits |
|---|---|
| ~~Flag for format 0/format 1A differentiation~~ | ~~1 bit~~ |
| Hopping flag | 1 bit |
| Resource block assignment and hopping resource allocation | N bits |
| ~~Modulation and coding scheme and redundancy version~~ | ~~5 bits~~ |
| ~~New data indicator~~ | ~~1 bit~~ |
| TPC command for scheduled PUSCH | 2 bits |

TABLE 23-continued

| Contents | | Number of bits |
|---|---|---|
| Cyclic shift for DMRS | | 3 bits |
| UL index (for TDD) | | 2 bits |
| Downlink Assignment Index (for TDD) | | 2 bits |
| CQI request | | 1 bit |
| Resource allocation header (resource allocation type0/type 1) | | 1 bit |
| ~~Resource block assignment and hopping resource allocation~~ | | ~~N bits~~ |
| TPC command for PUCCH | | 2 bits |
| Downlink Assignment Index (for TDD) | | 2 bits |
| ~~HARQ process number~~ | | ~~3 bits(FDD), 4 bits(TDD)~~ |
| Transport block to codeword swap flag | | 1 bit |
| For 1$^{st}$ codeword | Modulation and coding scheme <u>and redundancy version</u> | 5 bits |
| | New data indicator | 1 bit |
| | ~~Redundancy version~~ | ~~2 bits~~ |
| For 2$^{nd}$ codeword | Modulation and coding scheme <u>and redundancy version</u> | 5 bits |
| | New data indicator | 1 bit |
| | ~~Redundancy version~~ | ~~2 bits~~ |
| Precoding information | | 3 bits/<u>N-bits</u> (2 transmit antennas at eNode-B) 6 bits/<u>N-bits</u> (4 transmit antennas at eNode-B) |

Table 23 shows an example of a new DCI format used to schedule a PUSCH in a multiple antenna port transmission mode in one uplink cell (or one component carrier). A DCI format defined in Table 23 may be referred to as a format index (e.g., DCI format 4) for differentiation from the previously defined DCI format.

In Table 23, fields that have been struck through indicate some fields which are not present in a PDCCH DCI format for UL MCW transmission whereas they are present in DCI format 0 (See Table 21) and DCI format 2 (See Table 22). Underlined fields indicate fields added to DCI format 0 (See Table 21) and DCI format 2 (Table 22).

A "Hopping flag" (frequency hopping flag) field may indicate whether PUSCH frequency hopping is applied. The "Hopping flag" field may be defined if contiguous resource assignment is applied to a PUSCH and may be omitted if non-contiguous resource assignment is applied to a PUSCH.

A "Resource block assignment and hopping resource allocation" field may indicate resource block assignment information of an uplink subframe depending on whether PUSCH frequency hopping is applied or single cluster assignment or multiple cluster assignment is applied.

A "TPC command for scheduled PUSCH" field indicates a value for deciding transmit power of PUSCH transmission. The "TPC command for scheduled PUSCH" field may be defined by 2 bits if an uplink transmitter (e.g., a UE)-specific transmit power control (TPC) command is given. Alternatively, if a TPC command is given with respect to each of a plurality of antennas, the "TPC command for scheduled PUSCH" field may be defined by a bit size of 2 bits×the number of antennas. A TPC command may be given with respect to each of two codewords and, in this case, the "TPC command for scheduled PUSCH" field may be defined by a size of 4 bits.

A "Cyclic shift for DMRS" field is a cyclic shift value used to generate a sequence for a demodulation reference signal (DMRS). The "Cyclic shift for DMRS" field may include an orthogonal cover code (OCC) index used to additionally generate a DMRS. A cyclic shift value of one layer (or one antenna port) may be given by the "Cyclic shift for DMRS" field. A cyclic shift value of another layer (or another antenna port) may be computed from the cyclic shift value given according to a predetermined rule based on the above layer (or antenna port).

A "UL index (for TDD)" field may indicate a subframe index set to uplink transmission in a specific uplink-downlink configuration if a radio frame is configured using a time division duplexing (TDD) scheme.

A "Downlink Assignment Index (for TDD)" field may indicate a total number of subframes set to PDSCH transmission in a specific uplink-downlink configuration if a radio frame is configured using a TDD scheme.

A "channel quality information (CQI) request" field indicates a request for reporting aperiodic CQI, a precoding matrix indicator (PMI) and a rank indicator (RI) using a PUSCH.

A "Resource allocation header (resource allocation type 0/type 1)" field may indicate resource allocation of Type 0 or Type 1. Type 0 may indicate contiguous resource allocation and Type 1 may indicate a variety of other forms of resource allocation. For example, Type 1 may indicate non-contiguous resource allocation. If a PUSCH resource allocation scheme is indicated via explicit or implicit signaling, the "Resource allocation header (resource allocation type 0/type 1)" field may be omitted.

A "TPC command for PUCCH" field may indicate a value for deciding transmit power of PUCCH transmission and may be omitted in some cases.

A "Transport block to codeword swap flag" field indicates a transport block-to-codeword mapping relationship if two transport blocks are enabled. If the "Transport block to codeword swap flag" field has a value of 0, this indicates that a transport block 1 is mapped to a codeword 0 and a transport block 2 is mapped to a codeword 1, and, if the "Transport block to codeword swap flag" field has a value of 1, this indicates that a transport block 2 is mapped to a codeword 0 and a transport block 1 is mapped to a codeword 1. If one of the two codewords is disabled, the "Transport block to codeword swap flag" field is reserved. Alternatively, if transport block to codeword swapping is not supported, the "Transport block to codeword swap flag" field may be omitted.

A "Modulation and coding scheme" and a "new data indicator" field may be defined with respect to two codewords (or transport blocks).

A "Modulation and coding scheme" field indicates a modulation order of each codeword (or each transport block). Some bit states of the "Modulation and coding scheme" field may be used to indicate RV information of each codeword (or each transport block). The RV may indicate information about which subpacket is retransmitted in case of retransmission of each codeword (or each transport block).

A "New data indicator" field indicates whether uplink scheduling information of each codeword (or each transport block) is new data or retransmitted data. If the value of this field is toggled from an NDI value of previous transmission of the codeword (or the transport block), this indicates that new data is transmitted and, if the value of this field is not toggled from an NDI value of previous transmission of the codeword (or the transport block), this indicates that data is retransmitted.

A "precoding information" field may indicate a codebook index for precoding of downlink transmission. If an uplink transmitter (e.g., a UE) includes two transmit antennas, the "precoding information" field may be defined by 3 bits in order to indicate codebook indexes of Rank 1 and Rank 2 and, if an uplink transmitter (e.g., a UE) includes four transmit antennas, the "precoding information" field may be defined by 6 bits in order to indicate codebook indexes of Rank 1, 2, 3 and 4.

Table 24 shows another example of a new DCI format used to schedule a PUSCH in a multiple antenna port transmission mode in one uplink cell (or one component carrier). A DCI format defined in Table 24 may be referred to as a format index (e.g., DCI format 4) for differentiation from the previously defined DCI format.

TABLE 24

| Contents | | Number of bits |
|---|---|---|
| Resource allocation header (resource allocation type0/type 1) | | 1 bit |
| Hopping flag | | 1 bit |
| Resource block assignment and hopping resource allocation | | N bits |
| TPC command for scheduled PUSCH | | 2 bits |
| Cyclic shift for DMRS | | 3 bits + N(0~3) bits |
| TPC command for PUCCH | | 2 bits |
| Transport block to codeword swap flag | | 1 bit |
| For 1$^{st}$ codeword | Modulation and coding scheme and redundancy version | 5 bits |
| | New data indicator | 1 bit |
| For 2$^{nd}$ codeword | Modulation and coding scheme and redundancy version | 5 bits |
| | New data indicator | 1 bit |
| Precoding information | | 3 bits/N-bits (2 transmit antennas at eNode-B) 6 bits/N-bits (4 transmit antennas at eNode-B) |
| CQI request | | 1 bit |
| UL index (for TDD) | | 2 bits |
| Downlink Assignment Index (for TDD) | | 2 bits |
| Downlink Assignment Index (for TDD) | | 2 bits |

Among the fields defined in the DCI format of Table 24, a description of the same fields as those of the DCI format of Table 23 will be omitted for clarity of description.

In the DCI format of Table 24, a "Cyclic shift for DMRS" field may indicate a cyclic shift value used to generate a sequence for an uplink DMRS. The "Cyclic shift for DMRS" field may include an OCC index used to additionally generate a DMRS. Through the "Cyclic shift for DMRS" field, cyclic shift values of a plurality of layers (or antenna ports) may be explicitly given. For example, one cyclic shift value may be represented by 3 bits and the "Cyclic shift for DMRS" field may be defined by a size of 12 bits in order to indicate the respective cyclic shift values of four layers (or four antenna ports).

The remaining fields of the DCI format of Table 24 are equal to those of the DCI format of Table 23.

Table 25 shows another example of a new DCI format used to schedule a PUSCH in a multiple antenna port transmission mode in one uplink cell (or one component carrier). A DCI format defined in Table 25 may be referred to as a format index (e.g., DCI format 4) for differentiation from the previously defined DCI format.

TABLE 25

| Contents | Number of bits |
|---|---|
| Resource allocation header (resource allocation type0/type 1) | 1 bit |
| Hopping flag | 1 bit |
| Resource block assignment and hopping resource allocation | N bits |
| TPC command for scheduled PUSCH | 2 bits |
| Cyclic shift for DMRS | 3 bits + N(0~3) bits |
| TPC command for PUCCH | 2 bits |
| New data indicator | 1 bit |
| Transport block to codeword swap flag | 1 bit |
| Modulation and coding scheme and redundancy version for 1$^{st}$ codeword | 5 bits |
| Modulation and coding scheme and redundancy version for 2$^{nd}$ codeword | 5 bits |
| Precoding information | 3 bits/N-bits (2 transmit antennas at eNode-B) 6 bits/N-bits (4 transmit antennas at eNode-B) |
| CQI request | 1 bit |
| UL index (for TDD) | 2 bits |
| Downlink Assignment Index (for TDD) | 2 bits |
| Downlink Assignment Index (for TDD) | 2 bits |

Among the fields defined in the DCI format of Table 25, a description of the same fields as those of the DCI format of Table 23 will be omitted for clarity of description.

In the DCI format of Table 25, a "Cyclic shift for DMRS" field may indicate a cyclic shift value used to generate a sequence for an uplink DMRS. The "Cyclic shift for DMRS" field may include an OCC index used to additionally generate a DMRS. By the "Cyclic shift for DMRS" field, cyclic shift values of 2 layers (or 2 antenna ports) may be explicitly given. For example, one cyclic shift value may be represented by 3 bits and the "Cyclic shift for DMRS" field may be defined by a size of 12 bits in order to indicate the respective cyclic shift values of four layers (or four antenna ports).

While the "New data indicator" fields of the codewords are defined in the DCI format of Table 23 or 24, only one "New data indicator" field may be defined with respect to two codewords in the DCI format of Table 25. That is, two codewords (or two transport blocks) are bundled to indicate whether uplink scheduling information is for new data or retransmitted data. If the value of this field is toggled from an NDI value of previous transmission, the two codewords (or two transport blocks) indicate new data transmission and, if the value of this field is not toggled from an NDI value of previous transmission, the two codewords (or two transport blocks) indicate retransmission.

The remaining fields of the DCI format of Table 25 are equal to those of the DCI format of Table 9.

In the DCI formats of Tables 23, 24 and 25, a "Carrier Indicator" field and a "Multi-cluster flag" field may be additionally defined. The "Carrier Indicator" field may indicate which uplink cell (or component carrier) is used to schedule MCW PUSCH transmission if one or more uplink cells (or one or more component carriers) are present, and may be represented by 0 or 3 bits. The "Multi-cluster flag" field may indicate whether multi-cluster allocation is applied in terms of uplink resource allocation.

Figure 10:
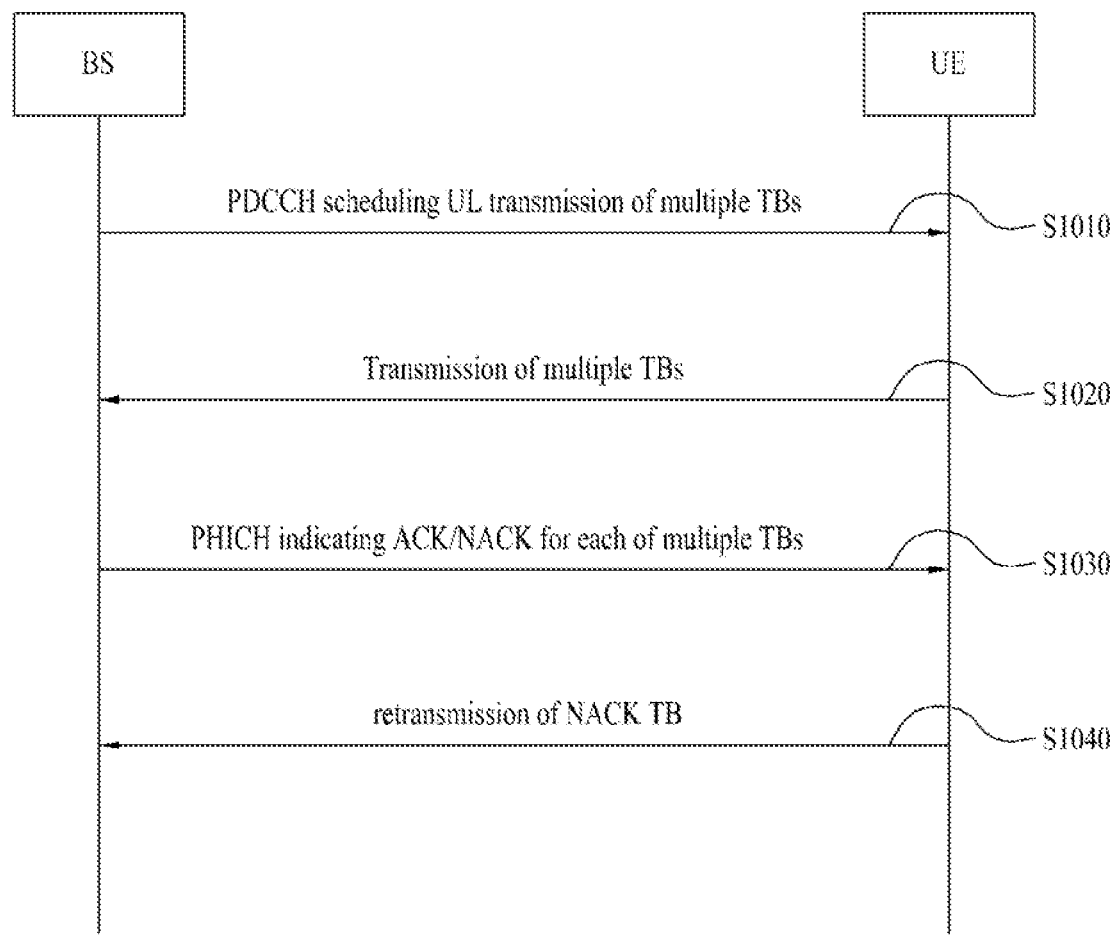
FIG. 10 is a flowchart illustrating uplink MIMO transmission and reception methods according to embodiments of the present invention.

FIG. 10 is a flowchart illustrating uplink MIMO transmission and reception methods according to embodiments of the present invention.

Referring to FIG. 10, a BS can transmit a UL grant PDCCH to a UE in step S1010. The UL grant PDCCH may include control information based on a DCI format scheduling transmission of multiple data blocks (i.e., multiple TBs).

The UE can transmit multiple TBs scheduled according to the UL grant PDCCH to the BS.

In step S1030, the BS may attempt to decode each of the received TBs, such that it can transmit ACK/NACK information of each TB to the UE through a PHICH.

The UE can retransmit a TB indicating NACK to the BS in step S1040. In step S1040, if the number of NACK TBs is not identical to the number of TBs indicated by a PDCCH of step S1010, a precoding matrix for the same number of transmission (Tx) layers as the number of layers corresponding to a NACK TB can be utilized in retransmission. That is, when retransmission of NACK TB is performed at step S1040 on the condition that the number of TBs indicated by a PDCCH is 2 and the number of NACK TBs is 1, one case in which the number of layers mapped to a codeword (i.e., one CW) mapped to NACK TBs is 1 may occur or another case in which the number of layers mapped to a codeword mapped to NACK TBs is 2 may occur. In this case, if the number of layers mapped to NACK TBs (or NACK CWs) is 1, a specific precoder from among precoders defined for one transmission (Tx) layer (i.e., Rank=1) can be used in retransmission. Alternatively, if the number of layers mapped to NACK TBs (or NACK CWs) is 2, a specific precoder from among precoders defined for two Tx layers (i.e., Rank=2) can be used in retransmission.

Here, retransmission of step S1040 may be performed when a PDCCH is not detected in a DL subframe (i.e., subframe of step S1030) through which the UE detects a PHICH. That is, if the HARQ operation is performed by ACK/NACK information indicated by a PHICH without using the UL grant PDCCH, the above-mentioned retransmission can be carried out.

In association with a precoding matrix used for retransmission, a precoder suitable for the number of Tx layers used in the above retransmission, from among precoding matrices indicated by the most recent PDCCH, can be used. In more detail, a precoding matrix, that is suitable for the number of layers mapped to retransmitted TBs (or CWs) from among the precoding matrices indicated by the most recent PDCCH, can be used for retransmission.

In addition, ACK/NACK information of each TB can be indicated through multiple PHICH resources. That is, one PHICH resource may be allocated to one TB.

In association with the UL MIMO transmission and reception method as shown in FIG. 10, the contents described in the above-mentioned embodiments may be used independently of each other or two or more embodiments may be simultaneously applied, and the same parts may be omitted herein for convenience and clarity of description.

In addition, the principles of the present invention may also be applied to the UL MIMO transmission and reception according to the present invention in association with not only MIMO transmission between a base station (BS) and a relay node (RN) (for use in in a backhaul uplink and a backhaul downlink) but also MIMO transmission between an RN and a UE (for use in an access uplink and an access downlink).

Figure 11:
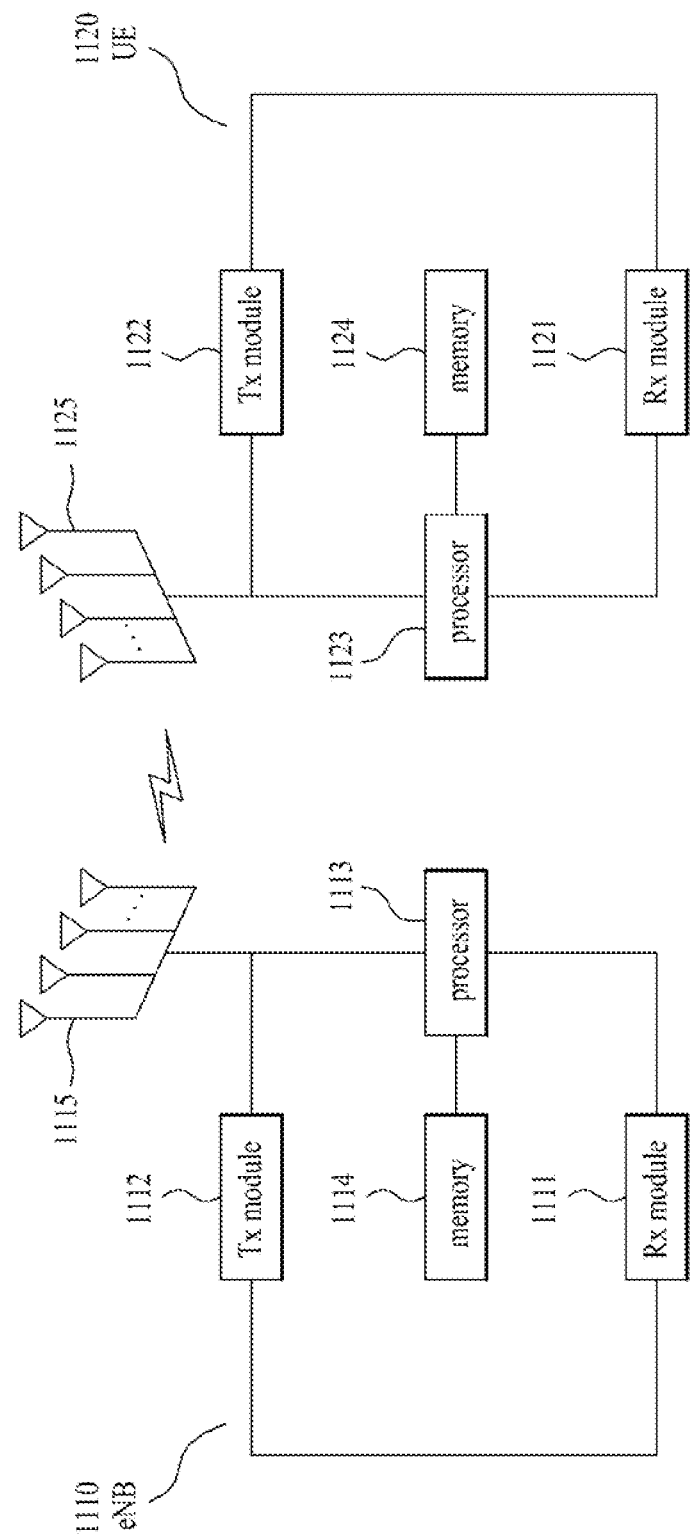
FIG. 11 is a block diagram illustrating a base station (BS) and a user equipment (BS) applicable to embodiments of the present invention.

FIG. 11 is a block diagram of an eNB apparatus and a UE apparatus according to an embodiment of the present invention.

Referring to FIG. 11, an eNB apparatus 1110 may include a reception (Rx) module 1111, a transmission (Tx) module 1112, a processor 1113, a memory 1114, and a plurality of antennas 1115. The plurality of antennas 1115 may be contained in the eNB apparatus supporting MIMO transmission and reception. The reception (Rx) module 1111 may receive a variety of signals, data and information on uplink starting from the UE. The transmission (Tx) module 1112 may transmit a variety of signals, data and information on downlink for the UE. The processor 1113 may provide overall control to the eNB apparatus 1110.

The eNB apparatus 1110 according to one embodiment of the present invention may be constructed to transmit control information of UL MIMO transmission. The processor 1113 of the eNB apparatus 1110 may enable the Tx module 1112 to transmit a DCI scheduling UL transmission of a plurality of TBs to a UE over a PDCCH. In addition, the processor 1113 may enable the Rx module 1111 to receive a plurality of TBs scheduled by DCI from a UE. In addition, the processor 1113 may enable the Tx module 1112 to transmit ACK or NACK indication information of each reception TB to the UE over a PHICH. In addition, the processor 1113 may enable the Rx module 1111 to receive retransmission information of a NACK TB from the UE. In this case, if the number of NACK TBs is not identical to the number of TBs indicated by a PDCCH, a precoding matrix for the same number of Tx layers as the number of layers corresponding to NACK TB can be used in retransmission.

The processor 1113 of the eNB apparatus 1110 processes information received at the eNB apparatus 1110 and transmission information. The memory 1114 may store the processed information for a predetermined time. The memory 1114 may be replaced with a component such as a buffer (not shown).

Referring to FIG. 11, a UE apparatus 1120 may include a reception (Rx) module 1121, a transmission (Tx) module 1122, a processor 1123, a memory 1124, and a plurality of antennas 1125. The plurality of antennas 1125 may be contained in the UE apparatus supporting MIMO transmission and reception. The reception (Rx) module 1121 may receive a variety of signals, data and information on downlink starting from the eNB. The transmission (Tx) module 1122 may transmit a variety of signals, data and information on uplink for the eNB. The processor 1123 may provide overall control to the UE apparatus 1120.

The UE apparatus 1120 according to one embodiment of the present invention may be constructed to perform UL MIMO transmission. The processor 1123 of the UE apparatus 1120 may enable the Rx module 1121 to receive a DCI scheduling UL transmission of a plurality of TBs from a UE over a PDCCH. In addition, the processor 1123 may enable the Tx module 1122 to transmit a plurality of TBs scheduled by DCI to the eNB. In addition, the processor 1123 may enable the Rx module 1121 to receive ACK or NACK indication information of each reception TB from the eNB over a PHICH. In addition, the processor 1123 may enable the Tx module 1122 to transmit retransmission information of a NACK TB to the eNB. In this case, if the number of NACK TBs is not identical to the number of TBs indicated by a PDCCH, a precoding matrix for the same number of Tx layers as the number of layers corresponding to NACK TB can be used in retransmission.

The processor 1123 of the UE apparatus 1120 processes information received at the UE apparatus 1120 and transmission information. The memory 1124 may store the processed information for a predetermined time. The memory 1124 may be replaced with a component such as a buffer (not shown).

The specific configurations of the above eNB and UE apparatuses may be implemented such that the various embodiments of the present invention are performed independently or two or more embodiments of the present invention are performed simultaneously. Redundant matters will not be described herein for clarity.

The eNB apparatus 1110 shown in FIG. 11 may also be applied to a relay node (RN) acting as a DL transmission entity or UL reception entity, and the UE apparatus 1120 shown in FIG. 11 may also be applied to a relay node (RN) acting as a DL reception entity or UL transmission entity.

The above-described embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

The embodiments of the present invention are applicable to a variety of mobile communication systems.

The invention claimed is:

1. A method for transmitting control information of uplink (UL) MIMO (Multiple Input Multiple Output) transmission by a base station (BS), the method comprising:
   transmitting downlink control information (DCI) scheduling UL transmission of a plurality of transport blocks to a user equipment (UE) through a physical downlink control channel (PDCCH);
   receiving the plurality of transport blocks scheduled by the DCI from the user equipment (UE);
   transmitting information indicating acknowledgement (ACK) or negative acknowledgement (NACK) of each of the received transport blocks to the user equipment (UE) through a physical hybrid-automatic repeat request indicator channel (PHICH); and
   receiving retransmission of a transport block indicating NACK from the user equipment (UE),
   wherein, if the number of NACK transport blocks is different from the number of a plurality of transport blocks indicated by the PDCCH, a precoding matrix for the same number of transmission layers as the number of layers corresponding to the NACK transport block is used in the retransmission.

2. The method according to claim 1, wherein the retransmission is carried out if a PDCCH is not detected in a downlink subframe in which the UE detects the PHICH.

3. The method according to claim 1, wherein the precoding matrix is a specific precoding matrix for the same number of transmission layers as the number of layers corresponding to the NACK transport block, from among a plurality of precoding matrices indicated by the most recent PDCCH.

4. The method according to claim 1, wherein a subframe performing the retransmission at the UE is a fourth subframe starting from a subframe in which the UE receives the PHICH.

5. The method according to claim 1, wherein one PHICH resource is allocated to one transport block (TB).

6. The method according to claim 1, wherein one transport block (TB) is mapped to a single codeword, and the single codeword is mapped to one or two layers.

7. A method for performing uplink (UL) MIMO (Multiple Input Multiple Output) transmission by a user equipment (UE), the method comprising:
   receiving downlink control information (DCI) scheduling UL transmission of a plurality of transport blocks from a base station (BS) through a physical downlink control channel (PDCCH);
   transmitting the plurality of transport blocks (TBs) scheduled by the DCI to the base station (BS);
   receiving information indicating acknowledgement (ACK) or negative acknowledgement (NACK) of each of the transmitted transport blocks from the base station (BS) through a physical hybrid-automatic repeat request indicator channel (PHICH); and transmitting retransmission of a transport block indicating NACK to the base station (BS), wherein, if the number of NACK transport blocks is different from the number of a plurality of transport blocks indicated by the PDCCH, a precoding matrix for the same number of transmission layers as the number of layers corresponding to the NACK transport block is used in the retransmission.

8. The method according to claim 7, wherein the retransmission is carried out if a PDCCH is not detected in a downlink subframe in which the UE detects the PHICH.

9. The method according to claim 7, wherein the precoding matrix is a specific precoding matrix for the same number of transmission layers as the number of layers corresponding to the NACK transport block, from among a plurality of precoding matrices indicated by the most recent PDCCH.

10. The method according to claim 7, wherein a subframe performing the retransmission at the UE is a fourth subframe starting from a subframe in which the UE receives the PHICH.

11. The method according to claim 7, wherein one PHICH resource is allocated to one transport block (TB).

12. The method according to claim 7, wherein one transport block (TB) is mapped to a single codeword, and the single codeword is mapped to one or two layers.

13. A base station (BS) for transmitting control information of uplink (UL) MIMO (Multiple Input Multiple Output) transmission comprising:

a reception module for receiving an uplink signal from a user equipment (UE);

a transmission module for transmitting a downlink signal to the user equipment (UE); and a processor for controlling the base station (BS) including the reception module and the transmission module, wherein the processor enables the transmission module to transmit downlink control information (DCI) scheduling UL transmission of a plurality of transport blocks to a user equipment (UE) through a physical downlink control channel (PDCCH), enables the reception module to receive the plurality of transport blocks scheduled by the DCI from the user equipment (UE), enables the transmission module to transmit information indicating acknowledgement (ACK) or negative acknowledgement (NACK) of each of the received transport blocks to the user equipment (UE) through a physical hybrid-automatic repeat request indicator channel (PHICH), and enables the reception module to receive retransmission of a transport block indicating NACK from the user equipment (UE), wherein, if the number of NACK transport blocks is different from the number of a plurality of transport blocks indicated by the PDCCH, a precoding matrix for the same number of transmission layers as the number of layers corresponding to the NACK transport block is used in the retransmission.

14. A user equipment (UE) for performing uplink (UL) MIMO (Multiple Input Multiple Output) transmission comprising:

a reception module for receiving a downlink signal from a base station (BS);

a transmission module for transmitting an uplink signal to the base station (BS); and a processor for controlling the user equipment (UE) including the reception module and the transmission module, wherein the processor enables the reception module to receive downlink control information (DCI) scheduling UL transmission of a plurality of transport blocks from the base station (BS) through a physical downlink control channel (PDCCH), enables the transmission module to transmit the plurality of transport blocks (TBs) scheduled by the DCI to the base station (BS), enables the reception module to receive information indicating acknowledgement (ACK) or negative acknowledgement (NACK) of each of the transmitted transport blocks from the base station (BS) through a physical hybrid-automatic repeat request indicator channel (PHICH), and enables the transmission module to transmit retransmission of a transport block indicating NACK to the base station (BS), wherein, if the number of NACK transport blocks is different from the number of a plurality of transport blocks indicated by the PDCCH, a precoding matrix for the same number of transmission layers as the number of layers corresponding to the NACK transport block is used in the retransmission.

* * * * *